United States Patent
Sugiyama

(10) Patent No.: US 8,098,997 B2
(45) Date of Patent: Jan. 17, 2012

(54) OPTICAL MODULATOR AND OPTICAL TRANSMITTER

(75) Inventor: Masaki Sugiyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 902 days.

(21) Appl. No.: 12/155,120

(22) Filed: May 29, 2008

(65) Prior Publication Data

US 2009/0067852 A1    Mar. 12, 2009

(30) Foreign Application Priority Data

Aug. 13, 2007    (JP) ................................ 2007-210856

(51) Int. Cl.
*H04B 10/04*    (2006.01)

(52) U.S. Cl. .................... 398/183; 398/185; 398/188

(58) Field of Classification Search .......... 398/183–188, 398/198
See application file for complete search history.

(56) References Cited

U.S. PATENT DOCUMENTS

| | | | |
|---|---|---|---|
| 6,591,026 B2 * | 7/2003 | Endo et al. ...................... 385/15 |
| 6,741,378 B2 | 5/2004 | Sugiyama et al. | |
| 2001/0007508 A1 * | 7/2001 | Ooi et al. ...................... 359/245 |
| 2001/0030796 A1 * | 10/2001 | Yao .............................. 359/334 |
| 2002/0044737 A1 * | 4/2002 | Hung ............................ 385/27 |
| 2004/0184755 A1 * | 9/2004 | Sugiyama et al. ............. 385/129 |
| 2006/0056002 A1 * | 3/2006 | Wooten et al. ................ 359/245 |
| 2006/0159384 A1 * | 7/2006 | Sugiyama ....................... 385/3 |

FOREIGN PATENT DOCUMENTS

JP    2003-233044    8/2003

OTHER PUBLICATIONS

M. L. Dennis et al., "Inherently bias drift free amplitude modulator", Electronics Letters, Mar. 14, 1996, vol. 32, No. 6, pp. 547-548.
N. A. Whitaker, Jr. et al., "Low-Drift Modulator Without Feedback", IEEE Photonics Technology Letters, vol. 4, No. 8, Aug. 1992, pp. 855-857.
E. H. W. Chan et al., "A New Technique for Generating Negative Coefficients in Photonic Signal Processors Based on Dual-Input and Dual-Output Intensity Modulator Sagnac Interferometers", IEEE Photonics Technology Letters, vol. 18, No. 11, Jun. 1, 2006, pp. 1252-1254.
Masaki Sugiyama et al., "Compact Zero-Chirp LiNbO$_3$ Modulator for 10-Gb/s Small-Form-Factor Transponder", 30$^{th}$ European Conference on Optical Communication, Sep. 5-9, 2004, ECOC 2004 Proceedings-Post-Deadline Paper Th4.2.3, pp. 20-21.

* cited by examiner

*Primary Examiner* — Dzung Tran
(74) *Attorney, Agent, or Firm* — Staas & Halsey LLP

(57) ABSTRACT

A reduction in size and cost of an optical modulator is achieved with a simple configuration, while improving the modulation characteristics. An optical modulator modulates light branched by an optical coupler and then couples the light via the optical coupler. The optical coupler is formed in a substrate having electro-optic effects. An optical waveguide is formed in the substrate and, includes a turnback section and ends into which the light branched by the optical coupler is input. A signal electrode is provided in the substrate along the optical waveguide. A modulation signal to modulate the light passing through the optical waveguide is input to the signal electrode.

18 Claims, 30 Drawing Sheets

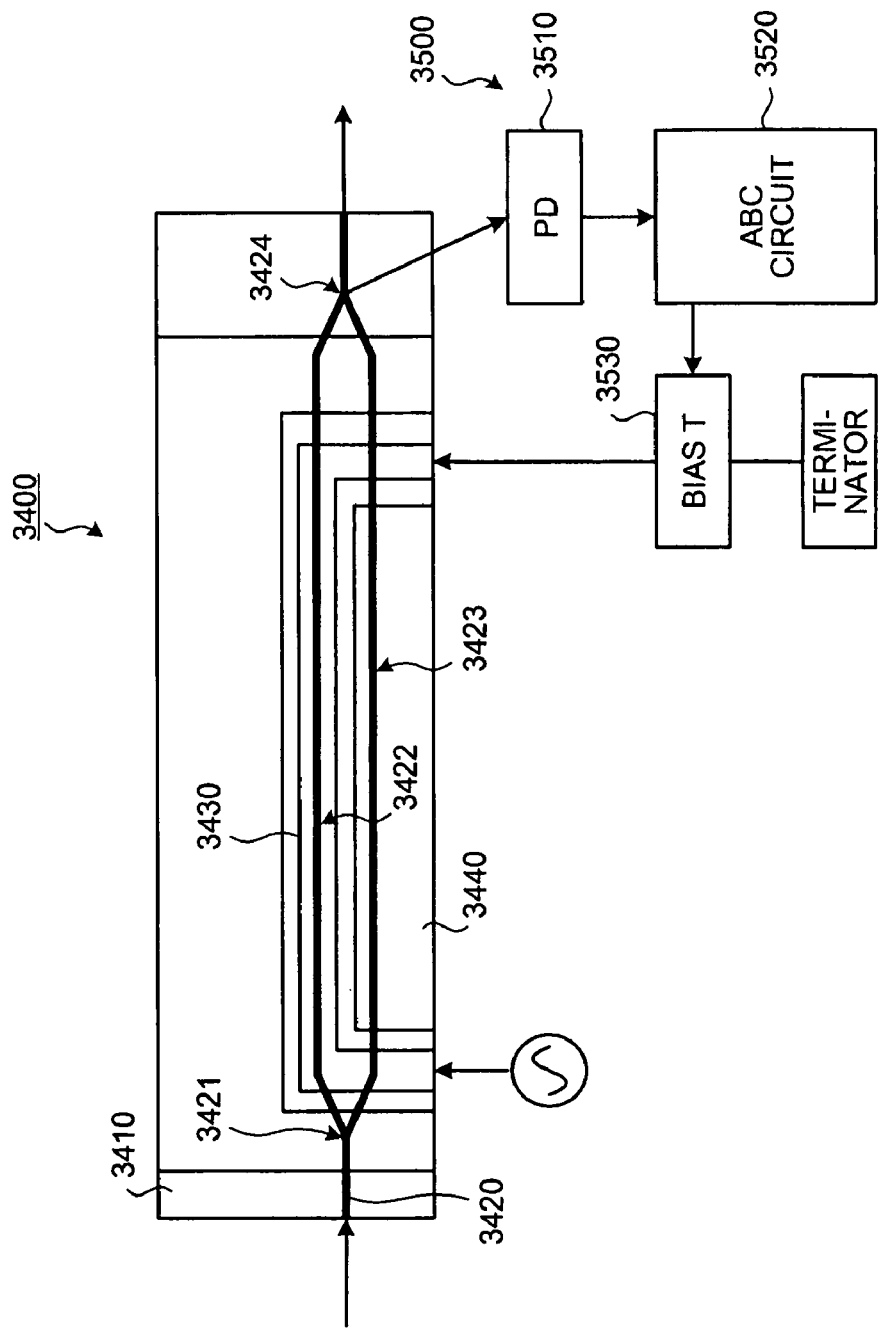

OPTICAL MODULATOR AND OPTICAL TRANSMITTER

CROSS-REFERENCE TO RELATED APPLICATIONS

This application is based upon and claims the benefit of priority from the prior Japanese Patent Application No. 2007-210856, filed on Aug. 13, 2007, the entire contents of which are incorporated herein by reference.

BACKGROUND OF THE INVENTION

1. Field of the Invention

The present invention relates to an optical modulator and an optical transmitter.

2. Description of the Related Art

In recent years, an optical waveguide device in which an optical waveguide is formed in an electro optic crystal, such as a lithium niobate (LiNbO$_3$) substrate and a lithium tantalate (LiTaO$_2$) substrate is used as an optical modulator in high-speed optical transmission systems of, for example, 40 Gbps. Japanese Patent Application Laid-Open Publication No. 2003-233044 teaches such a device. The optical modulator using this optical waveguide device is formed by thermally diffusing a metal film on a portion of an electro optic crystal substrate or effecting proton exchange in a benzoic acid after patterning to form an optical waveguide followed by provision of a signal electrode near the formed optical waveguide.

FIG. 34 is a plan view depicting a conventional optical modulator configuration. A conventional optical modulator 3400 shown in FIG. 34 is a Mach-Zehnder type optical modulator that modulates the intensity of light. A Mach-Zehnder type optical waveguide 3420 including a branching unit 3421, parallel waveguides 3422 and 3423, and a coupling unit 3424 is formed on an electro optic crystal plate 3410. In addition, a signal electrode 3430 is formed along the parallel waveguide 3422. Moreover, ground electrodes 3440 are formed along the parallel waveguide 3423.

In a section where the parallel waveguide 3422 and the signal electrode 3430 interact, a refractive index of the parallel waveguide 3422 changes due to the effect of an electric field of microwaves passing through the signal electrode 3430. As a result, light passing through the parallel waveguide 3422 is subjected to phase modulation according to the microwaves passing through the signal electrode 3430. Light output from the coupling unit 3424 is subjected to intensity modulation according to a phase difference between the light respectively passing through the parallel waveguides 3422 and 3423.

In the conventional art, however, lengths of the parallel waveguides 3422 and 3423 change with temporal changes, such as a variation in temperature, thereby causing operating point drift and resulting in a problem in that modulation characteristics deteriorate. Operating point drift is a phenomenon in which an optical length until each branched light is coupled is shifted and the phase difference between the branched light in the coupling unit 3424 fluctuates, thereby degrading the optical signal output from the coupling unit 3424. As a countermeasure, applying bias to either one of the branched lights to correct the operating point drift may be considered.

FIG. 35 is a plan view depicting a configuration of an optical modulator that corrects operating point drift. As shown in FIG. 35, the optical modulator 3400 includes a correction circuit 3500 in addition to the configuration of the optical modulator 3400 shown in FIG. 34. The correction circuit 3500 includes a photo diode (PD) 3510, an auto bias control (ABC) circuit 3520, and a biasT 3530.

When the optical modulator 3400 is an OFF state, the PD 3510 receives radiated light output from the coupling unit 3424, converts the radiated light into an electrical signal, and outputs the electrical signal to the ABC circuit 3520. The ABC circuit 3520 determines a bias voltage to be fed back to the signal electrode 3430 according to the electrical signals output from the PD 3510, and supplies the determined bias voltage to the signal electrode 3430 via the biasT 3530.

However, there are problems associated with the optical modulator 3400 shown in FIG. 35 in that as a result of providing the correction circuit 3500 therein, control is complicated, power consumption increases, and the size and cost of optical modulator increases. Particularly, in recent years, conventional communication of 10 Gb/s is moving toward high speed communication of 40 Gb/s. Components used in the correction circuit 3500 for 40 Gb/s are expensive, or have problems in that their characteristics are insufficient or they are large in size.

Meanwhile, in terms of a optical modulator configuration that does not generate the operating point drift, a configuration has been proposed in which each branching unit of the optical coupler is connected by a turnback optical fiber to thereby shift the phase while allowing each of the branched lights to pass in the turnback optical fiber in opposite directions (refer to IEEE Photonics Technology Letters, Vol. 18, No. 11, June 2006, p. 1252; IEEE Photonics Technology Letters, Vol. 4, No. 8, August 1992, p. 855; Electronics Letters, Vol. 32, No. 6, March 1996, p. 547).

In this conventional art, however, since the optical coupler, the turnback optical fiber, and the phase modulator are discrete parts, there is a problem that practical application is difficult in terms of mounting, size, and cost. Specifically, since each branching unit of the optical coupler and the phase modulator are connected by the turnback optical fibers, respectively, it is difficult to mount them, leading to an increase in manufacturing cost.

Additionally, since it is necessary to respectively provide connection portions that mutually connect the optical coupler, the turnback optical fiber and the phase modulator, the optical modulator increases in size, leading to increased manufacturing cost. Further, since the optical length from the optical coupler to the phase modulator is adjusted, it is necessary to accurately adjust the length of the turnback optical fiber of each portion. Still further, it is necessary to match polarization angles of the branched light passing through the turnback optical fiber. For this reason, mounting is difficult, leading to an increase in manufacturing cost.

The present invention solves the problems, and aims at providing an optical modulator and an optical transmitter that can achieve a reduction in size and cost of the optical modulator with a simple configuration, while improving modulation characteristics.

SUMMARY OF THE INVENTION

It is an object of the present invention to at least solve the above problems in the conventional technologies.

An optical modulator according to one aspect of the present invention includes an optical coupler that is formed in a substrate having electro-optic effects and, branches and couples light input thereto; an optical waveguide that is formed in the substrate and, includes a turnback section and ends into which the light branched by the optical coupler is input; and a first signal electrode provided in the substrate along the optical waveguide and into which a first modulation signal for modulating the light passing through the optical waveguide is input.

An optical transmitter according to another aspect of the present invention includes an optical modulator having an optical coupler that is formed in a substrate having electro-optic effects and, branches and couples light input thereto, an optical waveguide that is formed in the substrate and, includes a turnback section and ends into which the light branched by the optical coupler is input, and a first signal electrode provided in the substrate along the optical waveguide and into which a first modulation signal for modulating the light passing through the optical waveguide is input. The optical transmitter also includes a driving unit that supplies the first modulation signal to the first signal electrode to drive the optical modulator; and a transmitting unit that transmits an optical signal modulated by the optical modulator.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 35 is a plan view depicting a configuration of an optical modulator that corrects operating point drift.

DETAILED DESCRIPTION OF THE PREFERRED EMBODIMENTS

Referring to the accompanying drawings, exemplary embodiments according to the present invention are explained in detail below.

Figure 1:
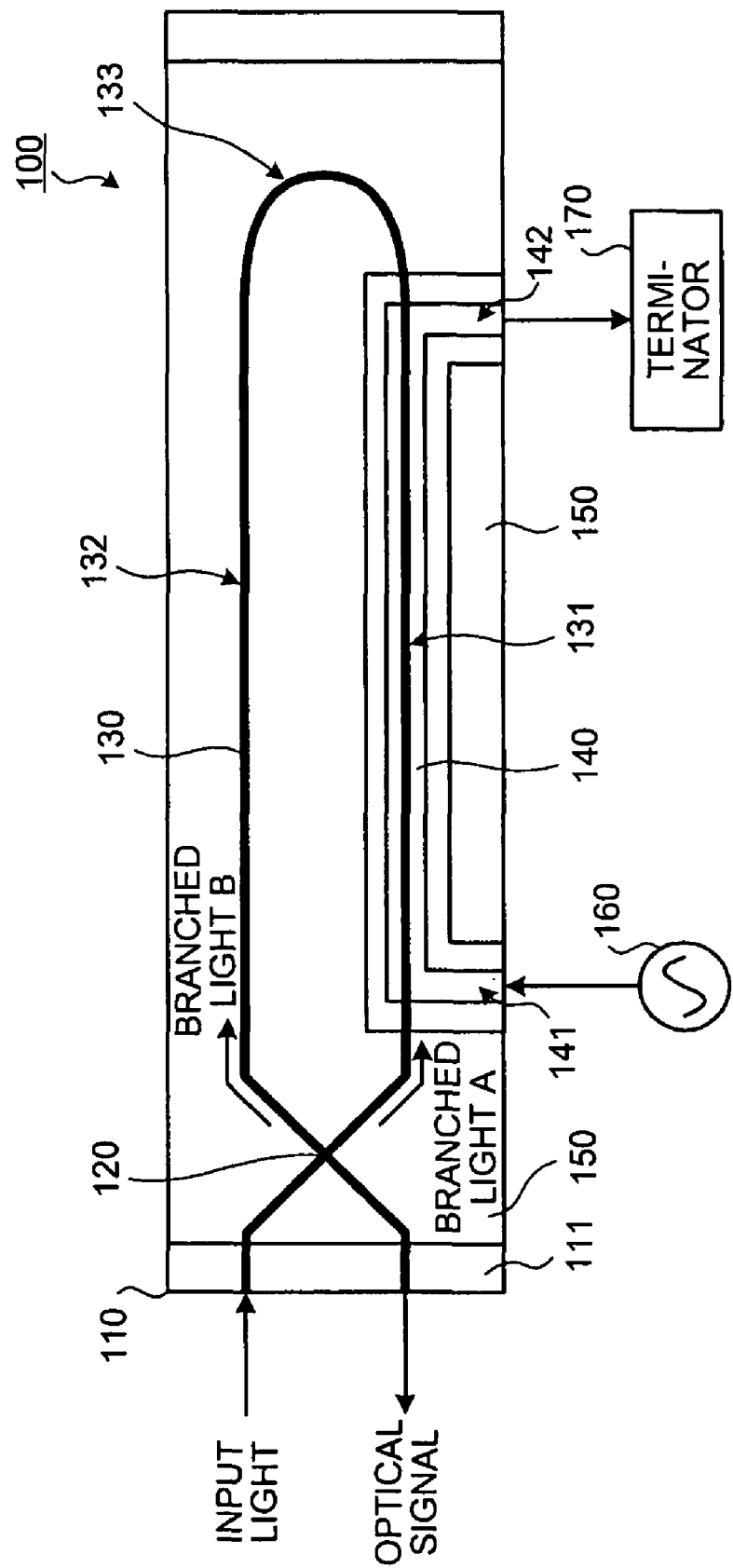
FIG. 1 is a plan view depicting a configuration of an optical modulator according to a first embodiment.

FIG. 1 is a plan view depicting a configuration of an optical modulator according to a first embodiment. As shown in FIG. 1, an optical modulator 100 according to the first embodiment includes a substrate 110, an optical coupler 120, an optical waveguide 130, a signal electrode 140, ground electrodes 150, a clock signal oscillator 160, and a terminator 170. The substrate 110 is an electro optic crystal substrate having electro optic effects, such as a $LiNbO_3$ substrate, a $LiTaO_2$ substrate, or the like.

The buffer layer 111 is formed at one aspect of the substrate 110. The buffer layer 111 is formed of an insulator, such as silicon dioxide ($SiO_2$) or the like. The buffer layer 111 prevents the signal electrode 140 and the ground electrodes 150 from absorbing light passing through the optical waveguide 130 formed in the substrate 110 to thereby cause optical loss, by being disposed between the substrate 110 and, the signal electrode 140 and the ground electrodes 150.

The optical coupler 120 branches an input light from an external source. The input light is a continuous wave light (CW light) that has not been modulated, or an optical signal that has been modulated, for example. In addition, the optical coupler 120 couples each of the branched lights input from both ends of the optical waveguide 130 to then output the coupled light as an optical signal to an external device. The optical coupler 120 is formed in the substrate 110 along with the optical waveguide 130 by mask patterns, for example.

The optical waveguide 130 is a single optical waveguide 130 formed in the substrate 110. In addition, the optical waveguide 130 has a turnback section 133. The light branched by the optical coupler 120 (hereinafter, each branch respectively referred to as "branched light A" and "branched light B") is input into the ends of the optical waveguide 130, respectively. The entire optical waveguide 130 need not be formed in the substrate 110, provided at least a part of the optical waveguide 130 is formed in the substrate 110.

Hereinafter, the optical waveguide 130 will be separated into sections and described with respect to the sections. The sections include a waveguide section 131 (first waveguide section) into which the branched light A output from the optical coupler 120 is input, a waveguide section 132 (second waveguide section) into which the branched light B output from the optical coupler 120 is input, and the turnback section 133 that optically connects, on the side opposite to the optical coupler 120, an end of the waveguide section 131 and an end of the waveguide section 132.

The signal electrode 140 is a traveling wave electrode provided on the substrate 110 along the optical waveguide 130. Here, the signal electrode 140 is provided on the substrate 110 along the waveguide section 131. In a section where the signal electrode 140 is provided along the optical waveguide 130, interaction between the signal electrode 140 and the optical waveguide 130 occurs, hereinafter interaction section. When a Z cut substrate is used for the substrate 110, refractive index variation due to an electric field in the Z direction is utilized, and thus the signal electrode 140 is provided directly above the waveguide section 131.

A modulation signal for modulating the light passing through the optical waveguide 130 is input into the signal electrode 140. The modulation signal is a microwave that passes through the signal electrode 140 in the same direction and at the same speed as that of the branched light A that passes through the optical waveguide 130. The modulation signal is an electrical clock signal that performs a clock modulation on the light, or an electrical data signal that performs data modulation on the light, for example. The electrical clock signal is a signal whose intensity alternately changes "0", "1", "0", "1", . . . , at a regular interval, and it is not limited to a sine wave, but may be a square wave, a triangular wave, or the like.

Hereinafter, a case in which the modulation signal is an electrical clock signal and the optical modulator 100 is constituted, as a clock modulator that performs clock modulation will be described. For example, when the input light is the CW light, the optical modulator 100 modulates the CW light into a clock signal. Meanwhile, when the input light is, for example, a phase modulation optical signal that has been subjected to phase modulation, the optical modulator 100 performs Return to Zero (RZ) on the optical signal to thereby modulate the optical signal into an RZ phase modulated optical signal.

Both ends of the signal electrode 140 are led out from one side of the substrate 110. The clock signal oscillator 160 is connected to an end 141 of the signal electrode 140 on the optical coupler 120 side, while the terminator 170 (resistance) is connected to an end 142 of the signal electrode 140 on the turnback section 133 side. The electrical clock signal that is generated by the clock signal oscillator 160 passes through the signal electrode 140 in the same direction as that of the branched light A passing through the waveguide section 131, and is output to the terminator 170.

The ground electrodes 150 are formed on the substrate 110 on each side of the signal electrode 140 respectively with a given space (gap) therebetween. Since the optical waveguide 130 is provided in the substrate 110, and the buffer layer 111, the signal electrode 140 and the ground electrodes 150 are provided thereabove, the optical waveguide 130 can not be seen actually, but is shown for the purpose of explanation.

Figure 2:
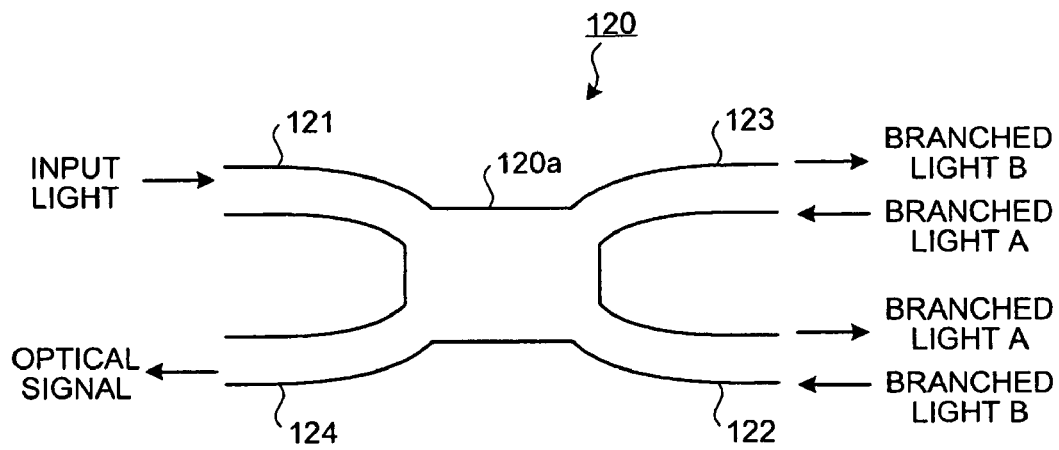
FIG. 2 is a plan view depicting a configuration of an optical coupler of the optical modulator.

FIG. 2 is a plan view depicting a configuration of the optical coupler of the optical modulator. As shown in FIG. 2, the optical coupler 120 of the optical modulator 100 is, for example, a 2×2 optical coupler (Multimode Interference Coupler (MMI)) with 3 dB. The optical coupler 120 includes an input unit 121, an input/output unit 122, an input/output unit 123, an output unit 124, and a branching/coupling unit 120a. The input light is input into the input unit 121 from an external source.

The branching/coupling unit 120a equally branches the input light input from the input unit 121. The input/output unit 122 (first input/output unit) outputs the branched light A branched by the branching/coupling unit 120a to one end (waveguide section 131) of the optical waveguide 130. The input/output unit 123 (second input/output unit) outputs the branched light B branched by the branching/coupling unit 120a to the other end (waveguide section 132) of the optical waveguide 130.

Meanwhile, the branching/coupling unit 120a couples the branched light A input from the input/output unit 123 via the optical waveguide 130, and the branched light B input from the input/output unit 122 via the optical waveguide 130. The output unit 124 outputs, to an external device, the optical signal that is generated by the branching/coupling unit 120a coupling the branched light A and the branched light B.

The input light input from the input unit 121 of the optical coupler 120 is branched into the branched light A and the branched light B. The branched light A is output from the input/output unit 122, passes through the optical waveguide 130, is turned back, and input into the input/output unit 123. Namely, the branched light A travels counterclockwise in the optical waveguide 130 in FIG. 1.

The branched light B is output from the input/output unit 123, passes through the optical waveguide 130, is turned back, and input into the input/output unit 122. Namely, the branched light B travels clockwise in the optical waveguide 130 in FIG. 1. As described above, the branched light A and the branched light B that have been branched by the optical coupler 120 pass through the optical waveguide 130 in different directions, and are input into the optical coupler 120 again to be coupled by the optical coupler 120.

The electrical clock signal is input in the same direction and at the same speed as that of the branched light A passing through the optical waveguide 130. Hence, an input direction of the electrical clock signal is opposite to that of the branched light B passing through the optical waveguide 130. While passing through the optical waveguide 130 in the interaction section, the branched light A and the branched light B are affected by the electric field caused by the electrical clock signal input into the signal electrode 140.

Figure 3:
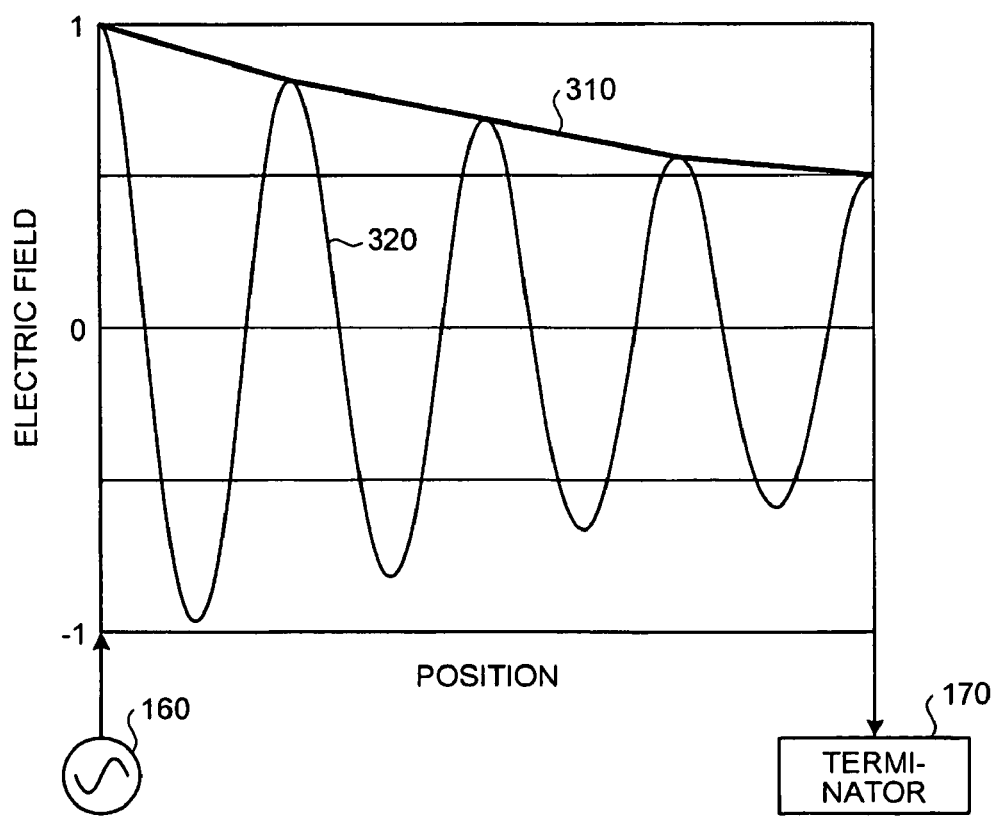
FIG. 3 is a graph of variation in an electric field applied to a branched light A and a branched light B.

FIG. 3 is a graph of variation in the electric field applied to the branched light A and the branched light B. In FIG. 3, a horizontal axis indicates a position in the interaction section. A left end of the horizontal axis corresponds to an end on the clock signal oscillator 160 side, in the interaction section. A right end of the horizontal axis corresponds to an end on the terminator 170 side, in the interaction section.

A vertical axis indicates the electric field of the electrical clock signal applied to each branched light passing through the interaction section. Symbol 310 indicates variation in the electric field applied to the branched light A. Symbol 320 indicates variation in the electric field applied to the branched light B.

Since the electrical clock signal travels through the signal electrode 140 in the same direction and at the same speed as that of the branched light A, with respect to the branched light A, an electric field in the same direction is always applied thereto as indicated in symbol 310. It is assumed here that the electric field applied to the branched light A is positive. Meanwhile, since the electrical clock signal travels through the signal electrode 140 in an opposite direction to and at the same speed as that of the branched light B, the electric field applied to the branched light B alternately changes between positive and negative as indicated in symbol 320.

Here, since the branched light B passes by the electrical clock signal at the same speed thereof, a frequency of the change in the electric field indicated by symbol 320 will become double the frequency of the electrical clock signal. Additionally, the electrical clock signal attenuates while traveling from the clock signal oscillator 160 to the terminator 170. For this reason, the smaller the magnitude of the electric field applied to each branched light is, the nearer the position is to the terminator 170 from the clock signal oscillator 160 as indicated by symbol 310 and symbol 320.

Figure 4:
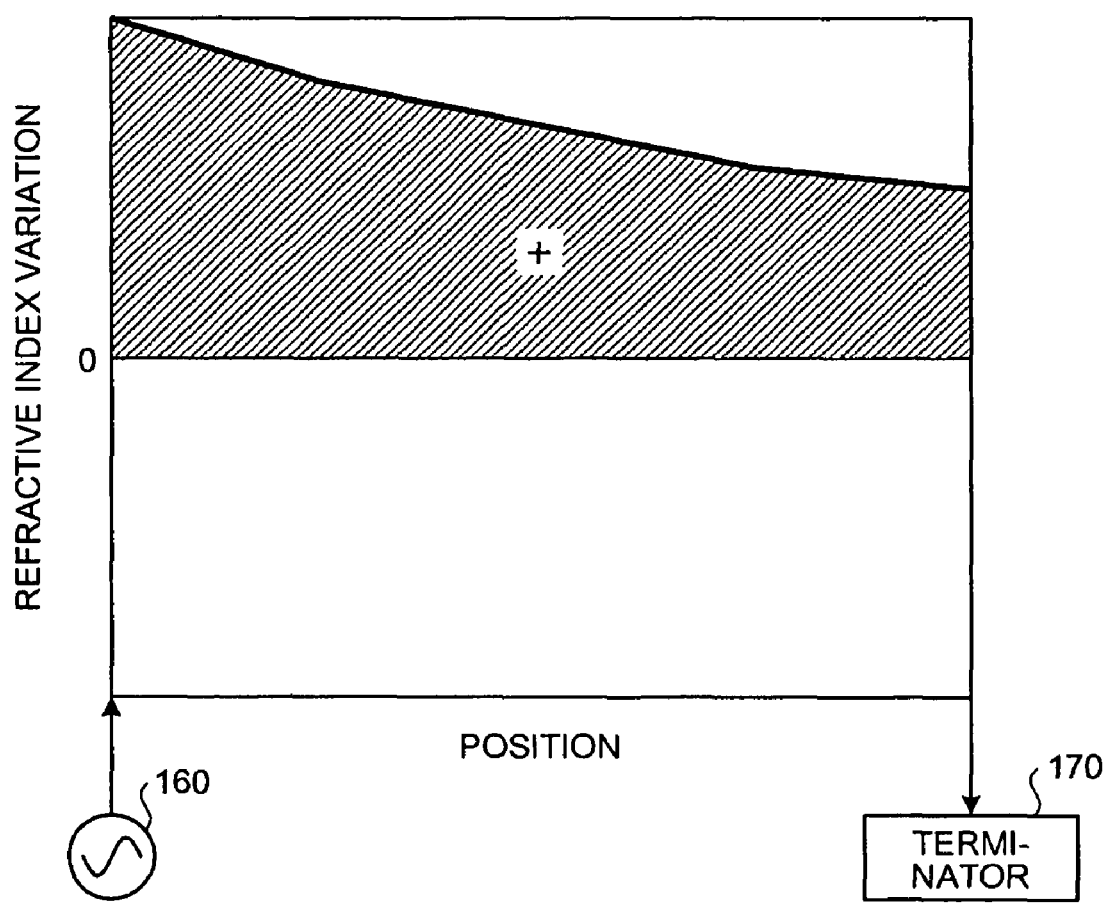
FIG. 4 is graph of refractive index variation for an interaction section with respect to the branched light A.

FIG. 4 is graph of refractive index variation for the interaction section with respect to the branched light A. Since a positive electric field is always applied to the branched light A (refer to symbol 310 in FIG. 3) in the interaction section, refractive index variation of the interaction section with respect to the branched light A is always on the positive side of 0. Hence, the phase of the branched light A passed through the interaction section is shifted to a positive direction.

A phase shift amount of the branched light A can be represented by integration (a shaded portion of the figure) of an amount of refractive index variation in the entire interaction section. Additionally, the phase shift amount of the branched light A can be adjusted by changing a length of the interaction section, or a voltage of the electrical clock signal.

Figure 5:
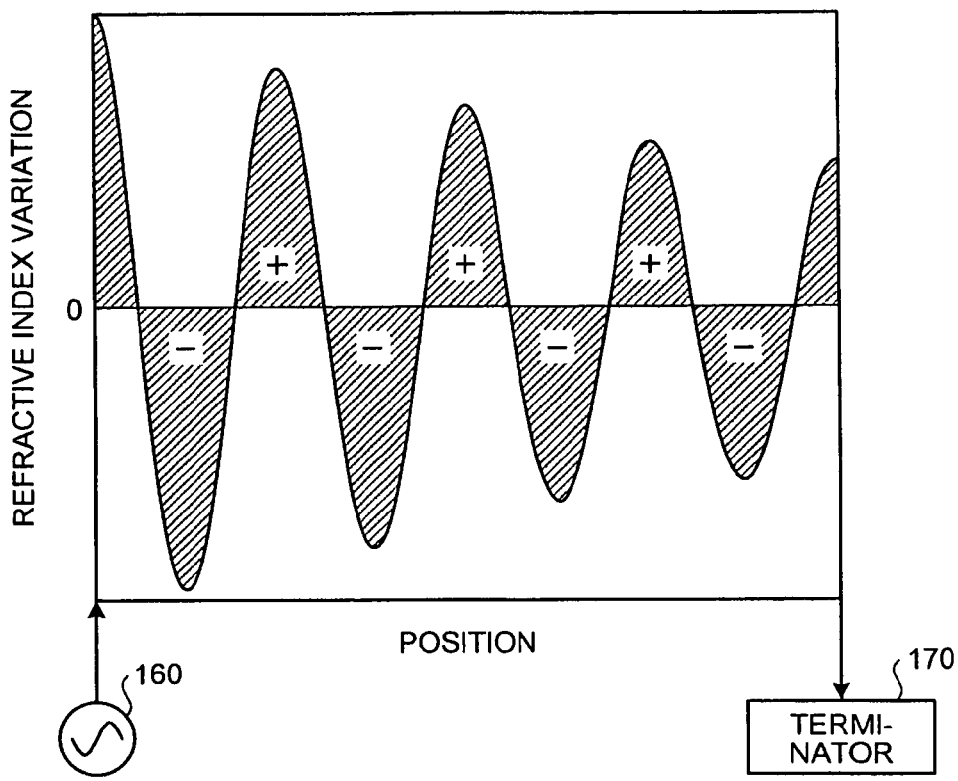
FIG. 5 is graph of refractive index variation for the interaction section with respect to the branched light B.

FIG. 5 is graph of refractive index variation for the interaction section with respect to the branched light B. Since the electric field applied to the branched light B alternately changes between positive and negative (refer to symbol 320 in FIG. 3) in the interaction section, the refractive index of the interaction section with respect to the branched light B alternately changes between positive and negative.

Hence, the shift direction of the phase of the branched light B alternately changes in a positive direction and a negative direction, so that phase shift amounts in both directions cancel each other, thus the total shift amount of the branched light B is close to 0. For this reason, a phase difference between the branched light A that has passed through the optical waveguide 130 and whose phase is shifted to a positive direction, and the branched light B that has passed through the optical waveguide 130 and whose phase is not shifted is generated.

Figure 6:
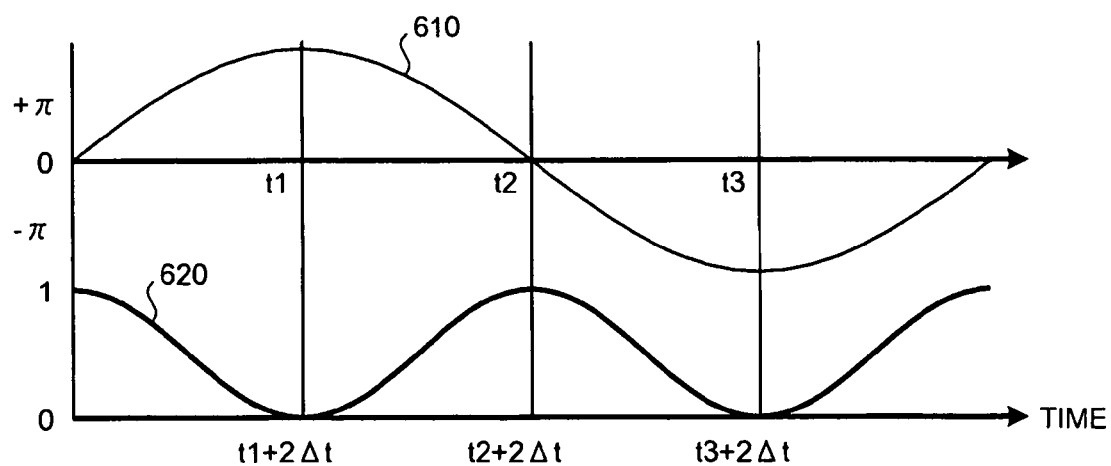
FIG. 6 is a wave form chart of an electrical clock signal to be input and an optical signal to be output.

FIG. 6 is a wave form chart of the electrical clock signal to be input and the optical signal to be output. In FIG. 6, a horizontal axis indicates time. The times t1, t2, and t3 indicate times when the electrical clock signal is input into the signal electrode 140. Times t1+2Δt, t2+2Δt, and t3+2Δt indicate times when the optical signal is output from the optical coupler 120 corresponding to the electrical clock signal input at the times t1, t2, and t3, respectively.

A vertical axis therein indicates intensities of the electrical clock signal input into the signal electrode 140 and the optical signal output from the optical coupler 120. Symbol 610 indicates a waveform of the electrical clock signal input into the signal electrode 140 (the intensity is between −π and +π). Symbol 620 indicates a waveform of the optical signal output from the optical coupler 120 (the intensity is between "0" and "1").

Figure 7:
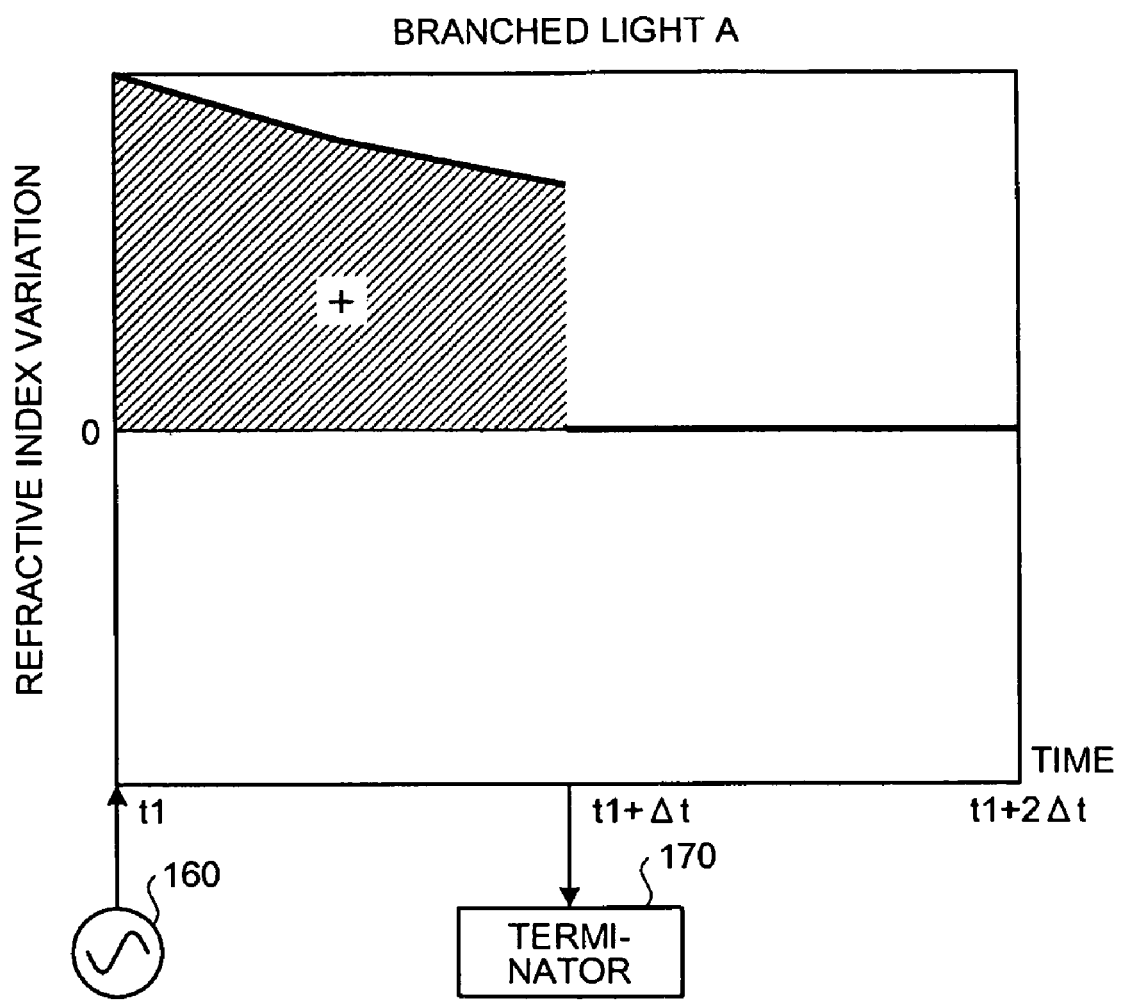
FIG. 7 is a graph (time t1) of refractive index variation for the interaction section with respect to the branched light A.

FIG. 7 is a graph (time t1) of refractive index variation for the interaction section with respect to the branched light A. As shown in FIG. 7, it is assumed that the branched light A passes through the interaction section (where the signal electrode 140 and the waveguide section 131 interact) during the times t1 to t1+Δt. Since the intensity of the electrical clock signal input into the signal electrode 140 is +π at this time (refer to symbol 610 in FIG. 6), the refractive index of the interaction section (where the signal electrode 140 and the waveguide section 131 interact) with respect to the branched light A varies on the positive side. For this reason, the phase of the branched light A is shifted to a positive direction.

It is assumed that the branched light A passes through the waveguide section 132 during the times t1+Δt to t1+2Δt. At this time, the branched light A is minimally affected by the electric field of the electrical clock signal, and the refractive index of the waveguide section 132 with respect to the branched light A changes minimally. For this reason, the phases of the branched light A cancel each other to be shifted minimally. Hence, the phase of the branched light A passed through the optical waveguide 130 is shifted to a positive direction. It is assumed here that the phase of the branched light A is shifted by +π.

Figure 8:
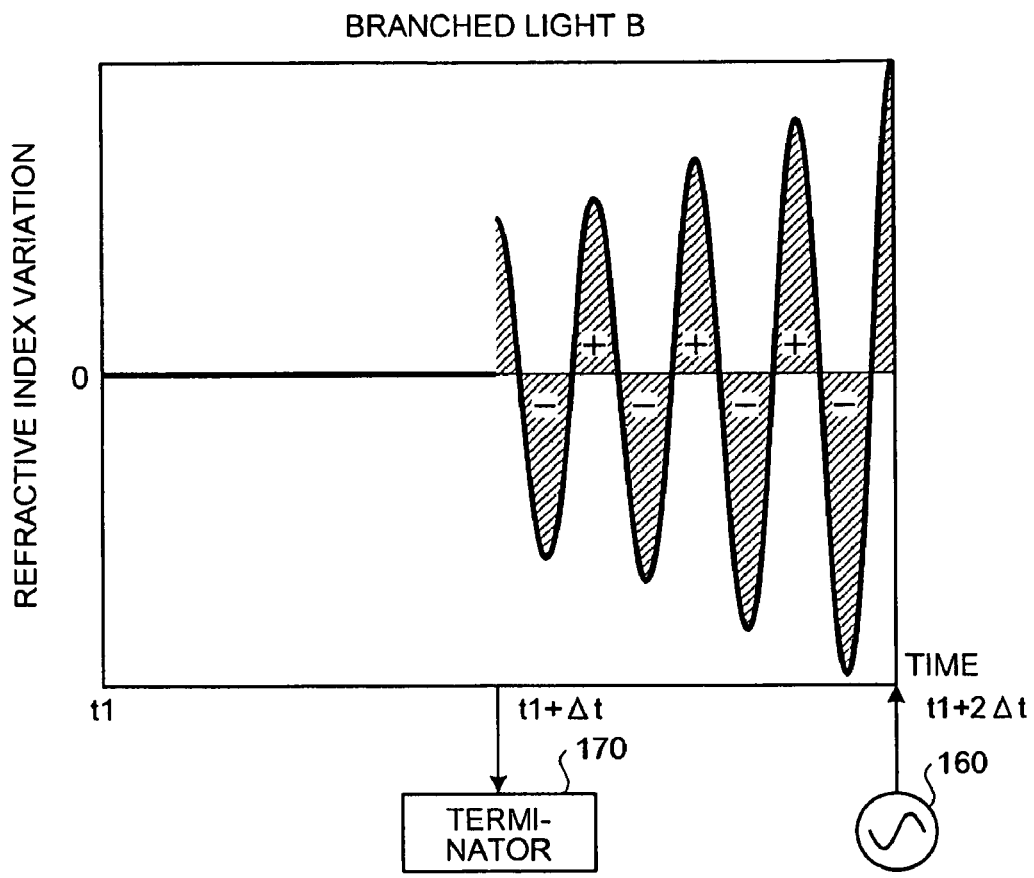
FIG. 8 is graph (time t1) of refractive index variation for the interaction section with respect to the branched light B.

FIG. 8 is graph (time t1) of refractive index variation for the interaction section with respect to the branched light B. As shown in FIG. 8, it is assumed that the branched light B passes through the waveguide section 132 during the times t1 to t1+Δt. At this time, the branched light B is minimally affected by the electric field of the electrical clock signal, and a refractive index of the waveguide section 132 with respect to the branched light B changes minimally. For this reason, the phase of the branched light B is shifted minimally.

It is assumed that the branched light B passes through the interaction section (where the signal electrode 140 and the waveguide section 131 interact) during the times t1+Δt to t1+2Δt. At this time, the refractive index of the interaction section with respect to the branched light B alternately changes between positive and negative. For this reason, the phase shift amounts of the branched light B cancel each other to be nearly 0. Hence, the phase of the branched light B passed through the optical waveguide 130 is shifted minimally.

Figure 9:
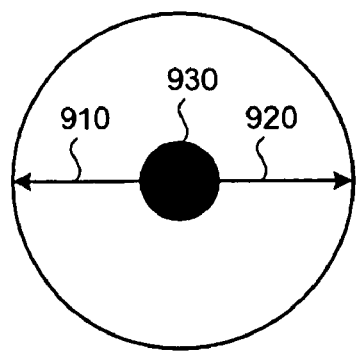
FIG. 9 is a schematic (time t1) showing phases and intensities of the branched light A, the branched light B, and the optical signal.

FIG. 9 is a schematic (time t1) showing the phases and intensities of the branched light A, the branched light B, and the optical signal. In FIG. 9, directions indicated by arrows indicate the phases of the branched lights. Lengths of the arrows indicate the intensities of the branched lights. Symbol 910 indicates the branched light A passed through the optical waveguide 130. Symbol 920 indicates the branched light B passed through the optical waveguide 130.

Figure 12:
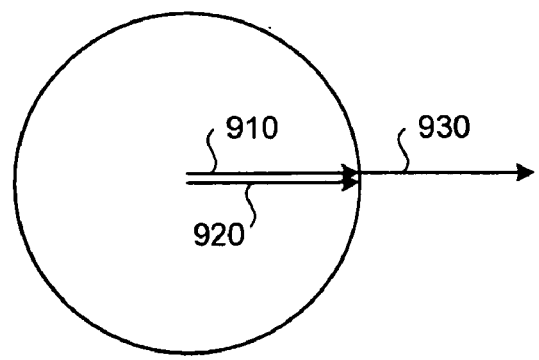
FIG. 12 is a schematic (time t2) showing the phases and intensities of the branched light A, the branched light B, and the optical signal.
Figure 15:
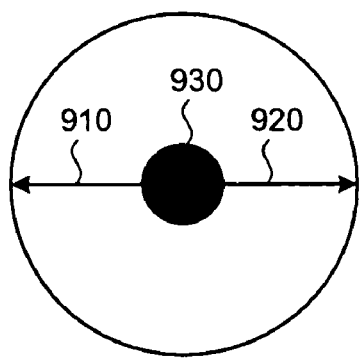
FIG. 15 is a schematic (time t3) showing the phases and intensities of the branched light A, the branched light B, and the optical signal.

Symbol 930 indicates the optical signal generated by the optical coupler 120 by coupling the branched light A passed through the optical waveguide 130 and the branched light B passed through the optical waveguide 130 are coupled (similar to that in FIG. 12 and FIG. 15). The phase of the branched light A indicated by symbol 910 is shifted by +π as shown in FIG. 9. Meanwhile, the phase of the branched light B indicated by symbol 920 is not shifted. Hence, a phase difference between the branched light A and the branched light B is π.

Additionally, since the optical coupler 120 equally divides the input light into two for branching into the branched light A and the branched light B, the intensities of the branched light A and the branched light B are the same. For this reason, the branched light A and the branched light B are coupled to generate the optical signal, the intensity of the optical signal output from the optical coupler 120 at the time t1+2Δt is "0" (refer to symbol 620 in FIG. 6).

Figure 10:
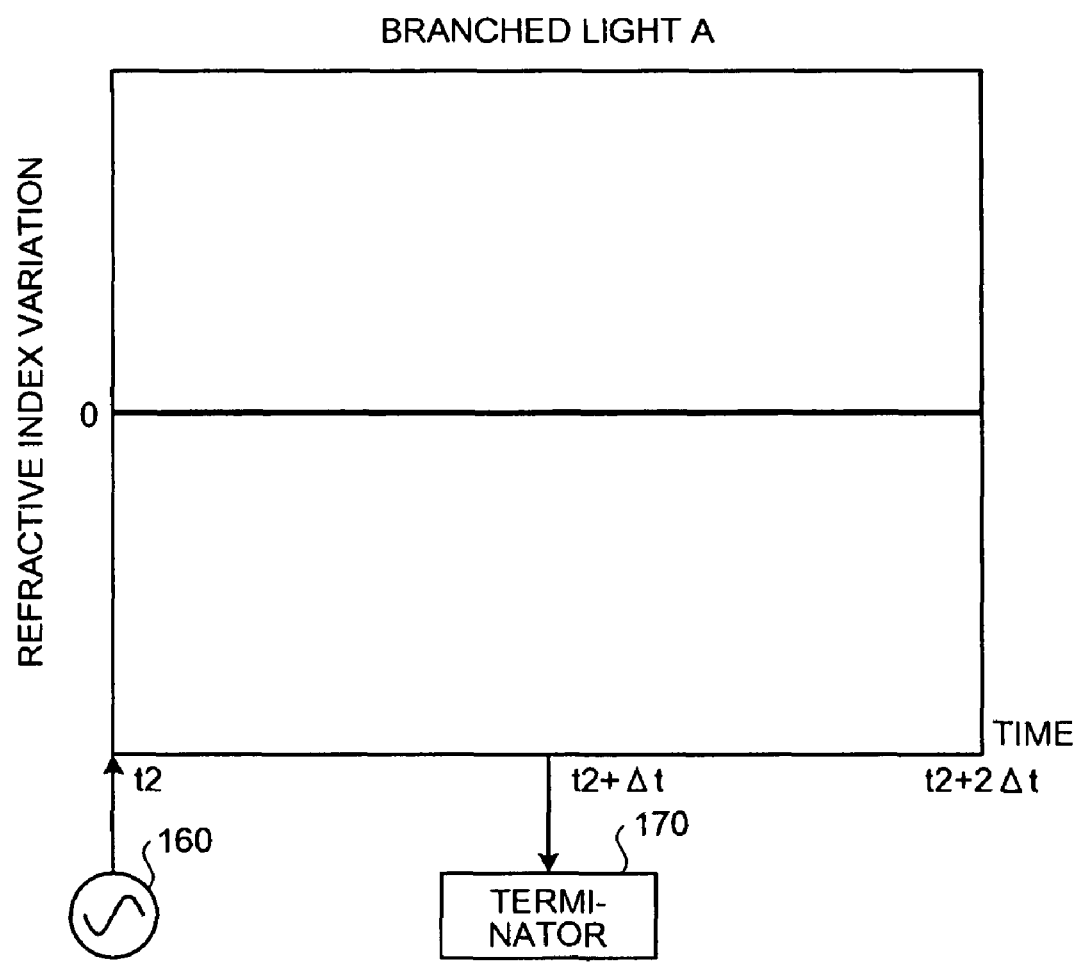
FIG. 10 is a graph (time t2) of refractive index variation for the interaction section with respect to the branched light A.

FIG. 10 is a graph (time t2) of refractive index variation for the interaction section with respect to the branched light A. As shown in FIG. 10, it is assumed that the branched light A passes through the interaction section (where the signal electrode 140 and the waveguide section 131 interact) during the times t2 to t1+Δt. Since the intensity of the electrical clock signal input into the signal electrode 140 is 0 at this time (refer to symbol 610 in FIG. 6), the refractive index of the interaction section (where the signal electrode 140 and the waveguide section 131 interact) with respect to the branched light A does not vary. For this reason, the phase of the branched light A is shifted to a positive direction.

It is assumed that the branched light A passes through the waveguide section 132 during the times t2+Δt to t2+2Δt. At this time, the branched light A is minimally affected by the electric field of the electrical clock signal, and the refractive index of the waveguide section 132 with respect to the branched light A changes minimally. For this reason, the phase of the branched light is shifted minimally. Hence, the phase of the branched light A passed through the optical waveguide 130 is shifted minimally.

Figure 11:
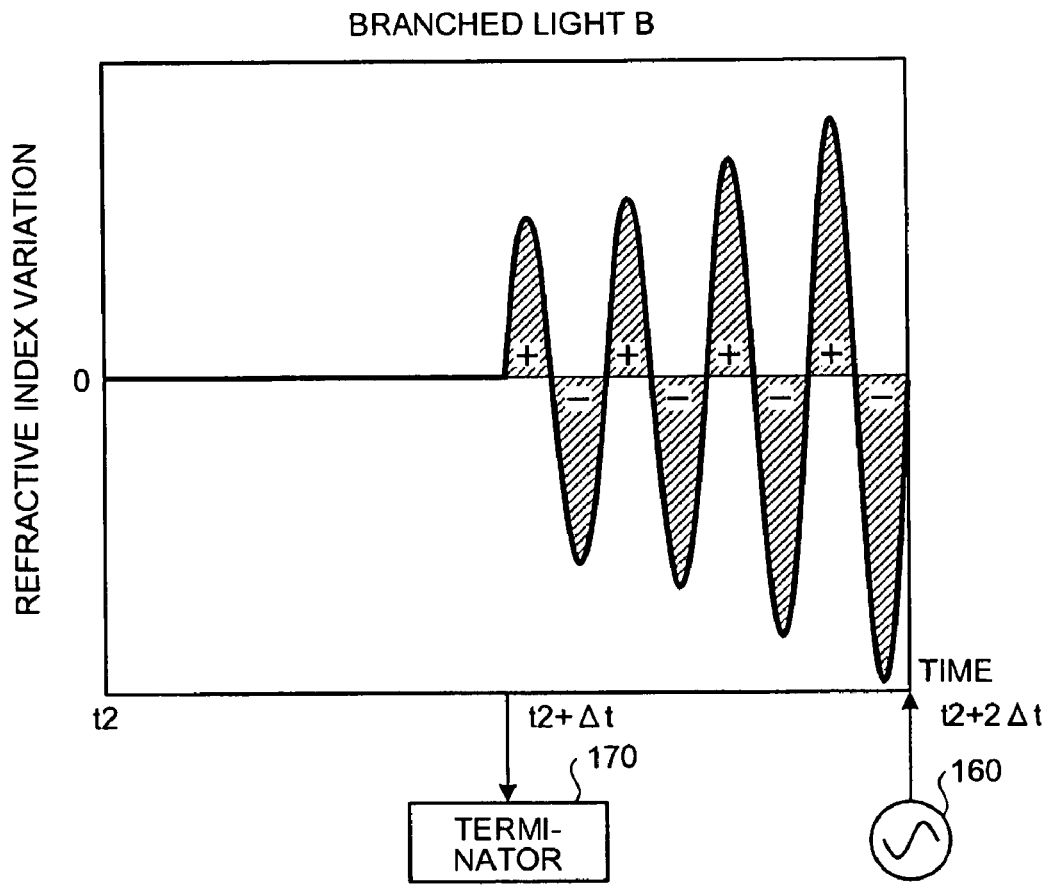
FIG. 11 is graph (time t2) of refractive index variation for the interaction section with respect to the branched light B.

FIG. 11 is graph (time t2) of refractive index variation for the interaction section with respect to the branched light B. As shown in FIG. 11, it is assumed that the branched light B passes through the waveguide section 132 during the times t2 to t2+Δt. At this time, the branched light B is affected minimally by the electric field of the electrical clock signal, and a refractive index of the waveguide section 132 with respect to the branched light B changes minimally. For this reason, the phase of the branched light B is shifted minimally.

It is assumed that the branched light B passes through the interaction section (where the signal electrode 140 and the waveguide section 131 interact) during the times t2+Δt to t2+2Δt. At this time, the refractive index of the interaction section with respect to the branched light B alternately changes between positive and negative due to the electrical signal that is steadily flowing through the signal electrode 140. For this reason, the phase shift amount of the branched light B becomes nearly 0. Hence, the phase of the branched light B passed through the waveguide 130 is not shifted.

FIG. 12 is a schematic (time t2) showing the phases and intensities of the branched light A, the branched light B, and the optical signal. As shown in FIG. 12, the phase of the branched light A indicated by symbol 910 is not shifted. The phase of the branched light B indicated by symbol 920 is not shifted, either. Hence, the phase difference between the branched light A and the branched light B becomes 0.

Additionally, since the optical coupler 120 equally divides the input light into two for branching into to the branched light A and the branched light B, the intensities of the branched light A and the branched light B are the same. For this reason, the branched light A and the branched light B are coupled to generate the optical signal, the intensity of the optical signal output from the optical coupler 120 at the time t2+2Δt is double the intensity of the branched light A or the branched light B, resulting in "1" (refer to symbol 620 in FIG. 6).

Figure 13:
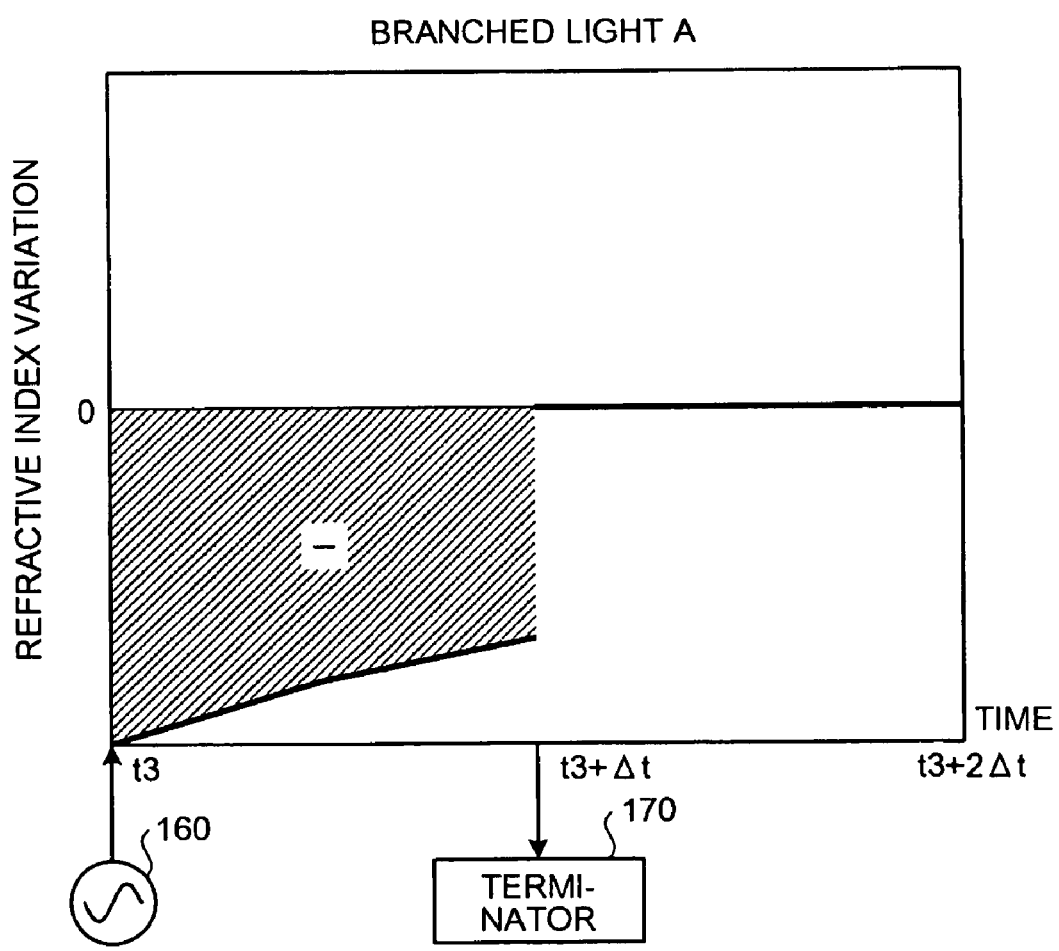
FIG. 13 is a graph (time t3) of refractive index variation for the interaction section with respect to the branched light A.

FIG. 13 is a graph (time t3) of refractive index variation for the interaction section with respect to the branched light A. As shown in FIG. 13, it is assumed that the branched light A passes through the interaction section (where the signal electrode 140 and the waveguide section 131 interact) during the times t3 to t3+Δt. Since the intensity of the electrical clock signal input into the signal electrode 140 is −π at this time (refer to symbol 610 in FIG. 6), the refractive index of the interaction section (where the signal electrode 140 and the waveguide section 131 interact) with respect to the branched light A varies on the negative side. For this reason, the phase of the branched light A is shifted to a negative direction.

It is assumed that the branched light A passes through the waveguide section 132 during the times t3+Δt to t3+2Δt. At this time, the branched light A is minimally affected by the electric field of the electrical clock signal, and the refractive index of the waveguide section 132 with respect to the branched light A changes minimally. For this reason, the phase of the branched light A is shifted minimally. Hence, the phase of the branched light A passed through the optical waveguide 130 is shifted to a negative direction. It is assumed here that the phase of the branched light A is shifted by −π.

Figure 14:
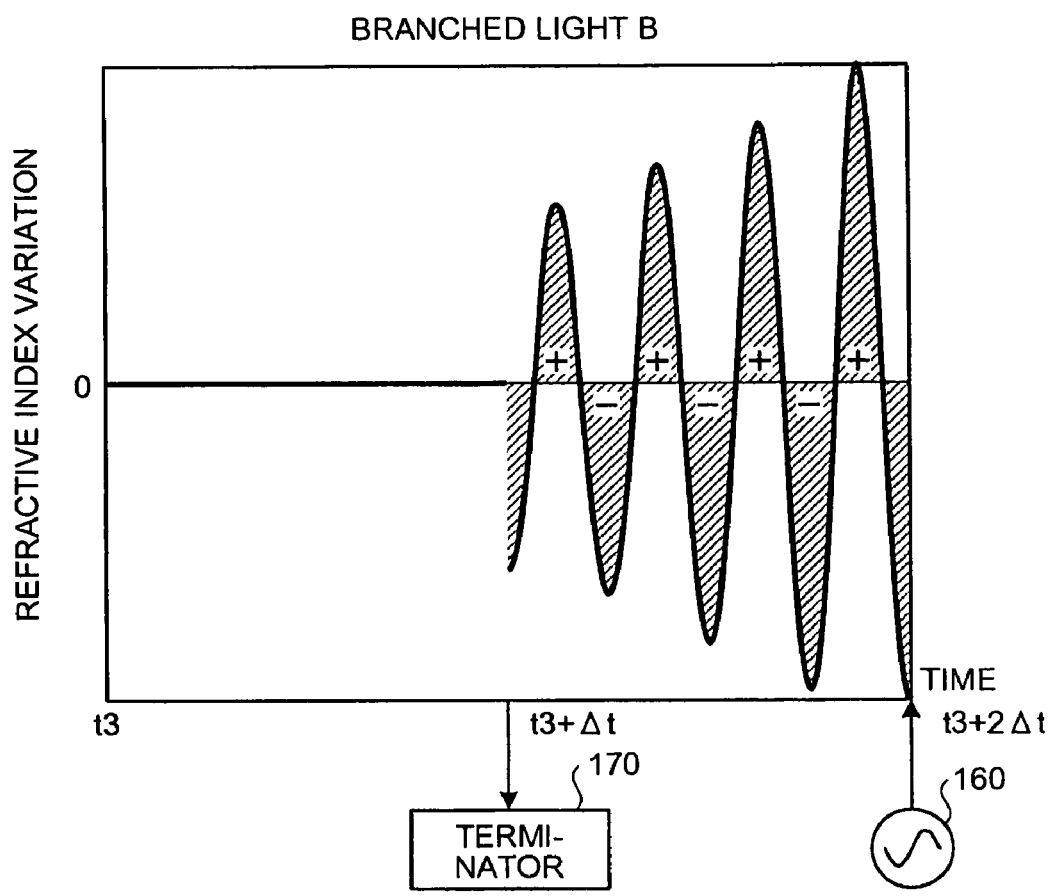
FIG. 14 is graph (time t3) of refractive index variation for the interaction section with respect to the branched light B.

FIG. 14 is graph (time t3) of refractive index variation for the interaction section with respect to the branched light B. As shown in FIG. 14, it is assumed that the branched light B passes through the waveguide section 132 during the times t3 to t3+Δt. At this time, the branched light B is minimally affected by the electric field of the electrical clock signal, and a refractive index of the waveguide section 132 with respect to the branched light B changes minimally. For this reason, the phase of the branched light B is shifted minimally.

It is assumed that the branched light B passes through the interaction section (where the signal electrode 140 and the waveguide section 131 interact) during the times t3+Δt to t3+2Δt. At this time, the refractive index of the interaction section with respect to the branched light B alternately changes between positive and negative. For this reason, the phase shift amounts of the branched light B cancel each other to be nearly 0. Hence, the phase of the branched light B passed through the optical waveguide 130 is shifted minimally.

FIG. 15 is a schematic (time t3) showing the phases and intensities of the branched light A, the branched light B, and the optical signal. As shown in FIG. 15, the phase of the branched light A indicated by symbol 910 is shifted by −π. The phase of the branched light B indicated by symbol 920 is not shifted. Hence, the phase difference between the branched light A and the branched light B becomes π.

Additionally, since the optical coupler 120 equally divides the input light into two for branching into to the branched light A and the branched light B, the intensities of the branched light A and the branched light B are the same. For this reason, the branched light A and the branched light B are coupled to generate the optical signal, the intensity of the optical signal output from the optical coupler 120 at the time t3+2Δt becomes 0 (refer to symbol 620 in FIG. 6).

The intensity of the optical signal output from the optical coupler 120 periodically changes to "0", "1", and "0" by the recursive occurrence of the state of the times t1, t2, and t3 shown in FIG. 7 through FIG. 15, thereby enabling generation of an optical clock signal as indicated by symbol 620 in FIG. 6. The frequency of the optical signal output from the optical coupler 120 is double from the frequency of the electrical clock signal input into the signal electrode 140 as indicated by symbol 610 and symbol 620 in FIG. 6.

Figure 16:
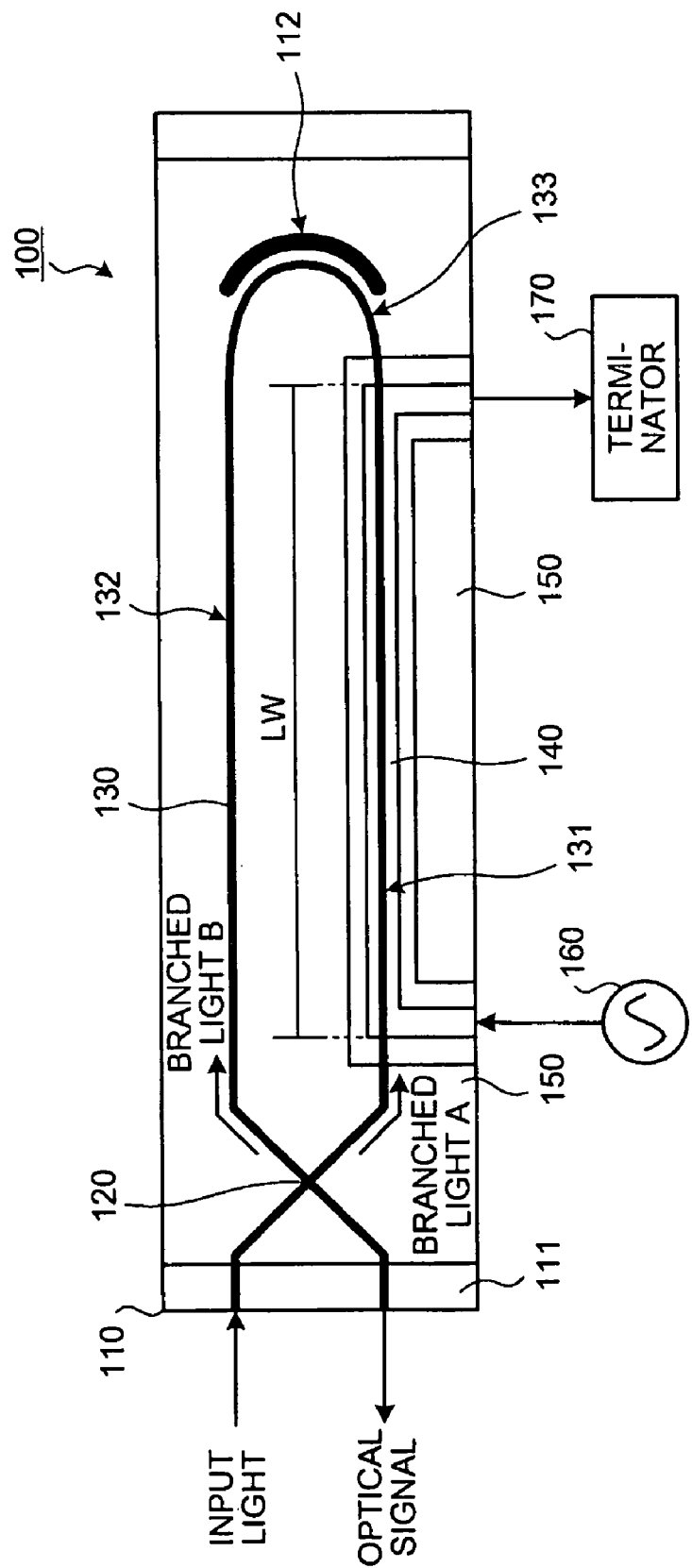
FIG. 16 is a plan view depicting the length of the interaction section.

FIG. 16 is a plan view depicting the length of the interaction section. In FIG. 16, Lw represents the length of the interaction section. If a wavelength of the electrical clock signal that is the modulation signal is λs, the length of the interaction section Lw is preferably one half of the wavelength λs (Lw≧λs/2) or more. The length of the interaction section Lw corresponds to a distance from the left end to the right end of the horizontal axis in FIG. 3.

Additionally, the wavelength λs of the electrical clock signal corresponds to double the wavelength (frequency double the electrical clock signal) of the waveform indicated by symbol 320 in FIG. 3. Setting the length Lw of the interaction section to one half of wavelength λs or more makes it possible to change the electric field applied to the branched light B by one cycle or more. For this reason, the refractive index of the interaction section with respect to the branched light B changes to both positive and negative values, and thus the phase shift amounts of the branched light B cancel each other, to be nearly 0.

Let the speed of light be c, a refractive index for the electrical clock signal passing through the signal electrode 140 be n, and the frequency of the electrical clock signal be f, the wavelength of the electrical clock signal λs is expressed by λs=c/(n×f). Taking into consideration that Lw is typically several millimeters or more, and of a bit rate of an LN optical modulator that is commonly used, the frequency of the electrical clock signal is preferably 10 GHz or more.

Meanwhile, to allow the electrical clock signal to pass at the same speed as that of the branched light A, it is only necessary to adjust a cross-sectional shape of the signal electrode 140 to thereby set the refractive index for the modulation signal of the signal electrode 140 to be the same as the refractive index for the branched light A of the waveguide section 131. Since the refractive index of the optical waveguide 130 is typically approximately 2.2 in the case of the LN modulator, the refractive index of the signal electrode 140 with respect to the modulation signal is also designed to be approximately 2.2.

When the frequency of the electrical clock signal is 10 GHz and the refractive index of the signal electrode 140 with respect to the modulation signal is 2.2, λs=13 millimeters, and thus Lw is designed to be 6.5 millimeters that is one half of λs, or more. Moreover, the longer the Lw is, the further the voltage of the electrical clock signal required to make the phase difference between the branched light A and the branched light B become 0 or π can be reduced. For this reason, taking into consideration that the length of the turnback section 133 is several millimeters, it is preferable to set Lw to 10 millimeters or more.

When the length Lw can be sufficiently set with respect to λs, the phase of the branched light B shifts in a negative direction most greatly when Lw=(¾+N)×λs, where N is an integer). Hence, the voltage of the electrical clock signal required to establish a phase difference of 0 or π between the branched light A and the branched light B can be reduced in an after-mentioned push-pull operation.

Moreover, as described above, when the turnback section 133 is a curved waveguide formed in the substrate 110, the optical waveguide 130 can be turned back within the substrate 110, thereby enabling a reduction in the size of the optical modulator 100. In such a curved waveguide, if the curvature thereof is large, optical loss thereof increases. Thus, it is effective to provide a groove 112 in the substrate 110 along a peripheral part of the curved waveguide.

This makes it possible to reduce the optical loss in the curved waveguide, even when the curvature of the curved waveguide is small (refer to, for example, European Conference On Communication 2004, Sep. 9, 2004, Postdeadline Paper, p. 20-21, Th 4.2.3). Hence, the curvature of the curved waveguide can be made small, thus enabling a further reduction in size of the optical modulator 100.

As described above, according to the optical modulator 100 according to the first embodiment, since the branched light A and the branched light B branched by the optical coupler 120 pass through, in opposite directions, the one optical waveguide 130 having the turnback section 133, and are input into the optical coupler 120 again to be coupled together, the optical lengths for the branched light A and the branched light B, from branching to coupling, become the same.

Thereby, the operating point drift resulting from the difference between the optical lengths of the branched light A and the branched light B is not caused, thereby improving modulation characteristics. In addition, since a correction circuit (refer to symbol 3500 in FIG. 35) for correcting the operating point drift is not required, a reduction in size and cost of the optical modulator can be achieved. Hence, reductions in size and cost can be achieved, while improving the modulation characteristics.

Moreover, integrally providing the optical coupler 120, the optical waveguide 130 having the turnback section 133, and the signal electrode 140 in the substrate 110 makes it possible to achieve a configuration to shift the phase without use of an optical fiber, while allowing each of the branched lights to pass in the optical waveguide in opposite directions. As a result, mounting becomes easy, and a reduction in size and cost of the optical modulator can be achieved.

Additionally, since the optical waveguide 130 can be formed in the substrate 110 using mask patterns or the like, the length from the optical coupler 120 to the interaction section can be adjusted with ease and precision. Moreover, since the polarization angles of each branched light do not change in the optical waveguide 130 formed in the substrate 110, the polarization angles of each of the branched lights can be easily matched with each other. As a result, mounting becomes easy and a reduction in size and cost of the optical modulator can be achieved.

Figure 17:
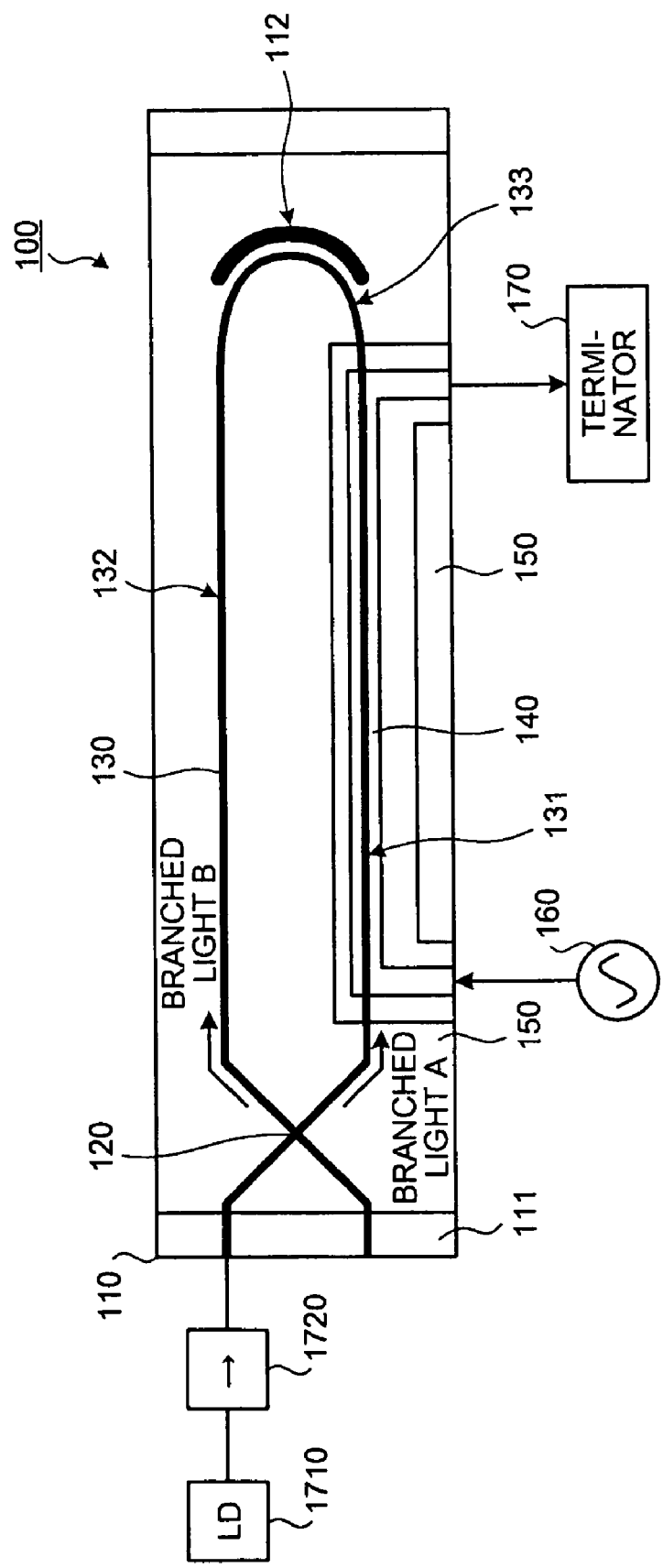
FIG. 17 is a plan view depicting a configuration of an optical modulator according to a second embodiment.

FIG. 17 is a plan view depicting a configuration of an optical modulator according to a second embodiment. As shown in FIG. 17, the optical modulator 100 according to the second embodiment includes a laser diode (LD) 1710 and an optical isolator 1720 upstream from the optical coupler 120. The LD 1710 generates CW light and outputs the generated CW light to the optical coupler 120 via the optical isolator 1720.

The optical isolator 1720 passes the light output from the LD 1710 to the optical coupler 120, and blocks out the light output from the optical coupler 120 to the LD 1710. In the optical modulator 100 according to the first embodiment, when the optical signal output from the output unit 124 is "1", the optical signal output from the input unit 121 is "0" based on characteristics of the 2×2 optical coupler constituting the optical coupler 120.

Meanwhile, when the optical signal output from the output unit 124 is "0", the optical signal output from the input unit 121 is "1". Namely, when the optical signal output from the output unit 124 is "0", the optical signal is output from the input unit 121 toward the LD 1710, and the optical signal is input into the LD 1710.

In contrast to this, the optical modulator 100 according to the second embodiment blocks out the optical signal output from the input unit 121 of the optical coupler 120 toward the LD 1710 by the optical isolator 1720. As a result, influences on the LD 1710 by the optical signal being input into the LD 1710 can be prevented. For example, degradation of the CW light output by the LD 1710 can be prevented.

Figure 18:
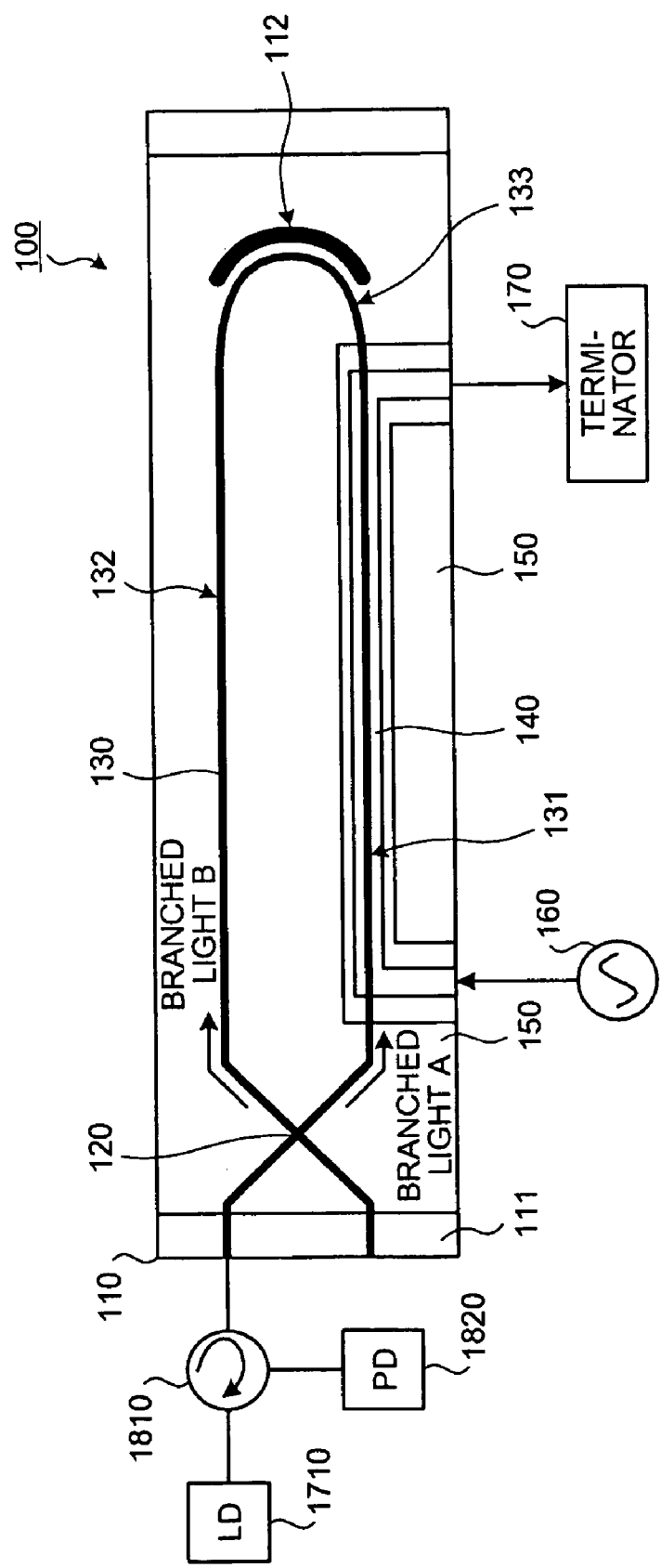
FIG. 18 is a plan view depicting a modified example of the configuration of the optical modulator according to the second embodiment.

FIG. 18 is a plan view depicting a modified example of the configuration of the optical modulator according to the second embodiment. As shown in FIG. 18, the optical modulator 100 according to the second embodiment includes an optical circulator 1810 and a PD 1820 instead of the optical isolator 1720. The LD 1710 outputs the generated CW light to the optical circulator 1810. The optical circulator 1810 outputs the light output from the LD 1710 to the optical coupler 120, and removes the light output from the optical coupler 120 toward the LD 1710 and outputs the light removed to the PD 1820.

The PD 1820 receives the light output from the optical circulator 1810, converts the light received into an electrical signal. As a result, while preventing the optical signal output from the optical coupler 120 from being input into the LD 1710, it is possible to monitor the optical signal output from the optical coupler 120 by removing the optical signal output from the optical coupler 120 and inputting the optical signal removed into the PD 1820.

For example, when another modulator is provided in series with the optical modulator 100, it becomes possible to synchronize modulation by the optical modulator 100 with modulation by another modulator by monitoring the timing of modulation of the optical signal output from the optical coupler 120. Moreover, it becomes possible to automatically control the intensity of the optical signal generated by the optical modulator 100, for example, by monitoring the intensity of the optical signal output from the optical coupler 120.

As described above, according to the optical modulator 100 according to the second embodiment, while achieving the effects of the optical modulator 100 according to the first embodiment, it is possible to prevent the optical signal output from the optical coupler 120 from being returned and input into the LD 1710. For this reason, degradation of the CW light output by the LD 1710 can be prevented. However, if the LD 1710 employed is an LD that can stably output the CW light, even when the light is input, it is not particularly necessary to provide the optical isolator 1720 or the optical circulator 1810.

Additionally, when another optical modulator is provided in upstream from the optical modulator 100, influences on another optical modulator by the optical signal output from the optical coupler 120 being returned and input into the other optical modulator can be avoided. For example, degradation of the optical signal input into the optical modulator 100 by another optical modulator can be prevented.

Figure 19:
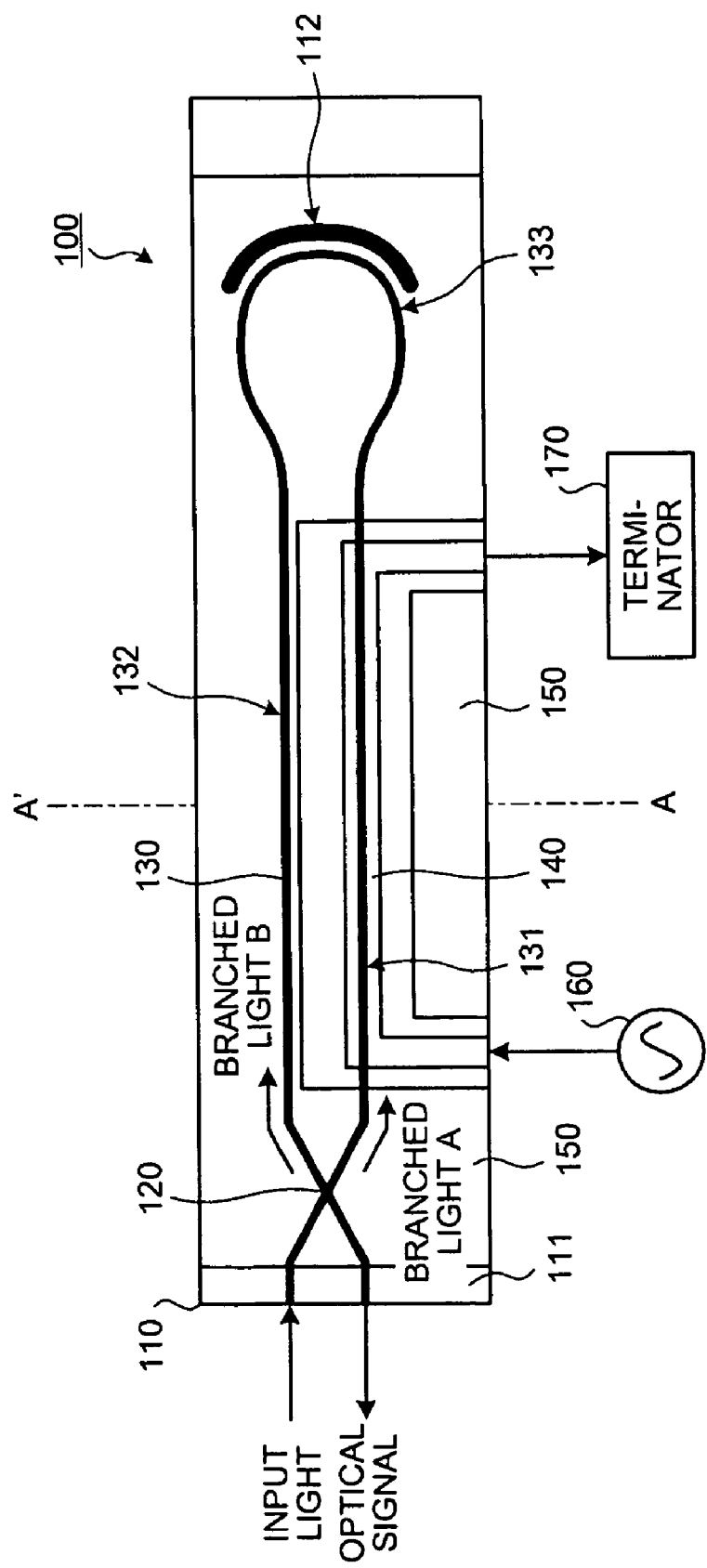
FIG. 19 is a plan view depicting a configuration of an optical modulator according to a third embodiment.

FIG. 19 is a plan view depicting a configuration of an optical modulator according to a third embodiment. As shown in FIG. 19, the signal electrode 140 of the optical modulator 100 according to the third embodiment is provided along the waveguide section 131. Meanwhile, an edge on the signal electrode 140 side of the ground electrode 150 provided on the waveguide 132 side of the signal electrode 140 is provided along the waveguide 132.

Figure 20:
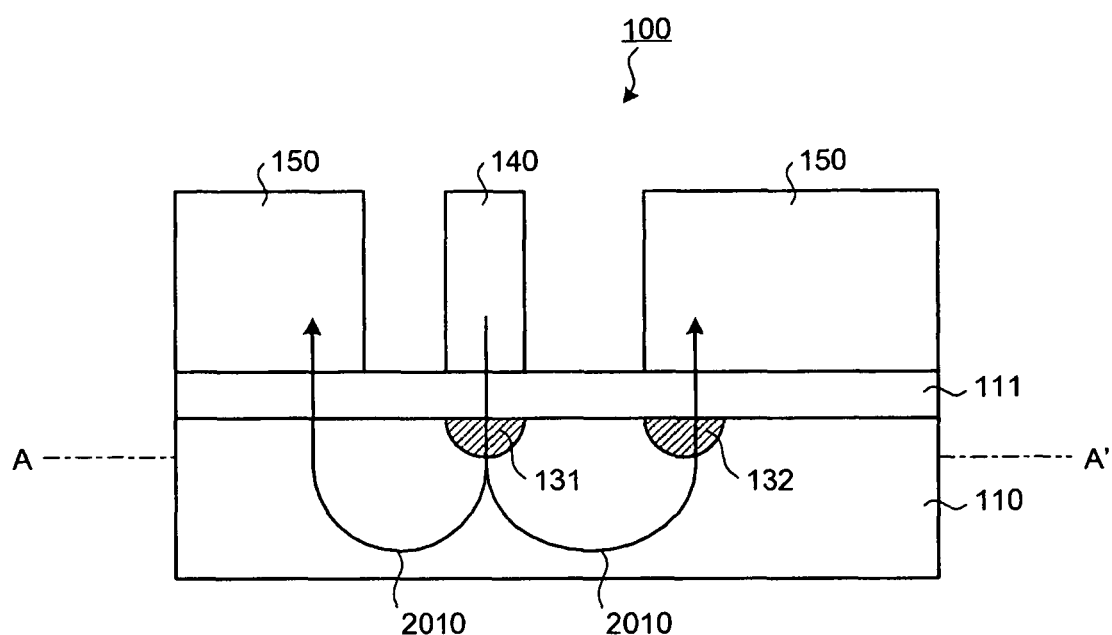
FIG. 20 is a sectional view along a line AA' in FIG. 19.

FIG. 20 is a sectional view along a line AA' in FIG. 19. In FIG. 20, symbol 2010 indicates an electric field due to the electrical clock signal passing through the signal electrode 140. The electric field 2010 due to the electrical clock signal of the signal electrode 140 is applied not only to the waveguide section 131 directly beneath the signal electrode 140 but also to the waveguide section 132 directly beneath the ground electrode 150.

The electric field applied to the waveguide section 132 becomes the strongest when the waveguide section 132 is arranged directly beneath the edge on the signal electrode 140 side of the ground electrode 150. For this reason, providing the edge on the signal electrode 140 side of the ground electrode 150 along the waveguide section 132 makes it possible to modulate the branched light passing through the waveguide section 132 while utilizing not only the electric field directly beneath the signal electrode 140 but also the electric field directly beneath the ground electrode 150.

In addition, a space between the waveguide section 131 and the waveguide section 132 is narrowed here. This makes it possible to provide the edge of the ground electrode 150 along the waveguide section 132 without increasing the space between the signal electrode 140 and the ground electrode 150 too much. Moreover, although the space between the waveguide section 131 and the waveguide section 132 is narrowed, curvature of the curved waveguide constituting the turnback section 133 is not correspondingly increased to prevent optical loss in the turnback section 133 from increasing.

Specifically, since the branched light A travels in the opposite direction to the traveling direction of the electrical clock signal, when passing through the waveguide section 132 after being turned back by the turnback section 133, the refractive index of the waveguide section 132 with respect to the branched light A alternately changes between positive and negative. For this reason, when the branched light A passes through the waveguide section 132, the phases cancel each other and no shifting takes place.

Meanwhile, the branched light B travels in the same direction as the traveling direction of the electrical clock signal, when output from the optical coupler 120 to then pass through the waveguide section 132. Moreover, a direction in which the electric field 2010 is to be applied to the waveguide section 132 is opposite to a direction in which the electric field 2010 is to be applied to the waveguide section 131. For this reason, the refractive index with respect to the branched light B of the waveguide section 132 becomes negative. Consequently, when the branched light B passes through the waveguide section 132, the phase thereof shifts in a negative direction.

As a result, when the branched light A passes through the waveguide section 131, the phase thereof shifts in a positive direction according to the electrical clock signal, whereas when the branched light B passes through the waveguide section 132, the phase thereof shifts in a negative direction according to the electrical clock signal. For this reason, the voltage of the electrical clock signal required to establish a phase difference of 0 or $\pi$ between the branched light A and the branched light B can be reduced. Moreover, the length of the interaction section required to establish a phase difference of 0 or $\pi$ between the branched light A and the branched light B can be reduced.

As described above, according to the optical modulator 100 according to the third embodiment, while achieving the effects of the optical modulator 100 according to the first embodiment, providing the edge on the signal electrode 140 side of the ground electrode 150 along the waveguide section 132 enables the required voltage of the electrical clock signal to deduced. Thereby, energy saving of the optical modulator can be achieved. Moreover, since the required length of the interaction section can be reduced, a reduction in the size of the optical modulator can be achieved.

Figure 21:
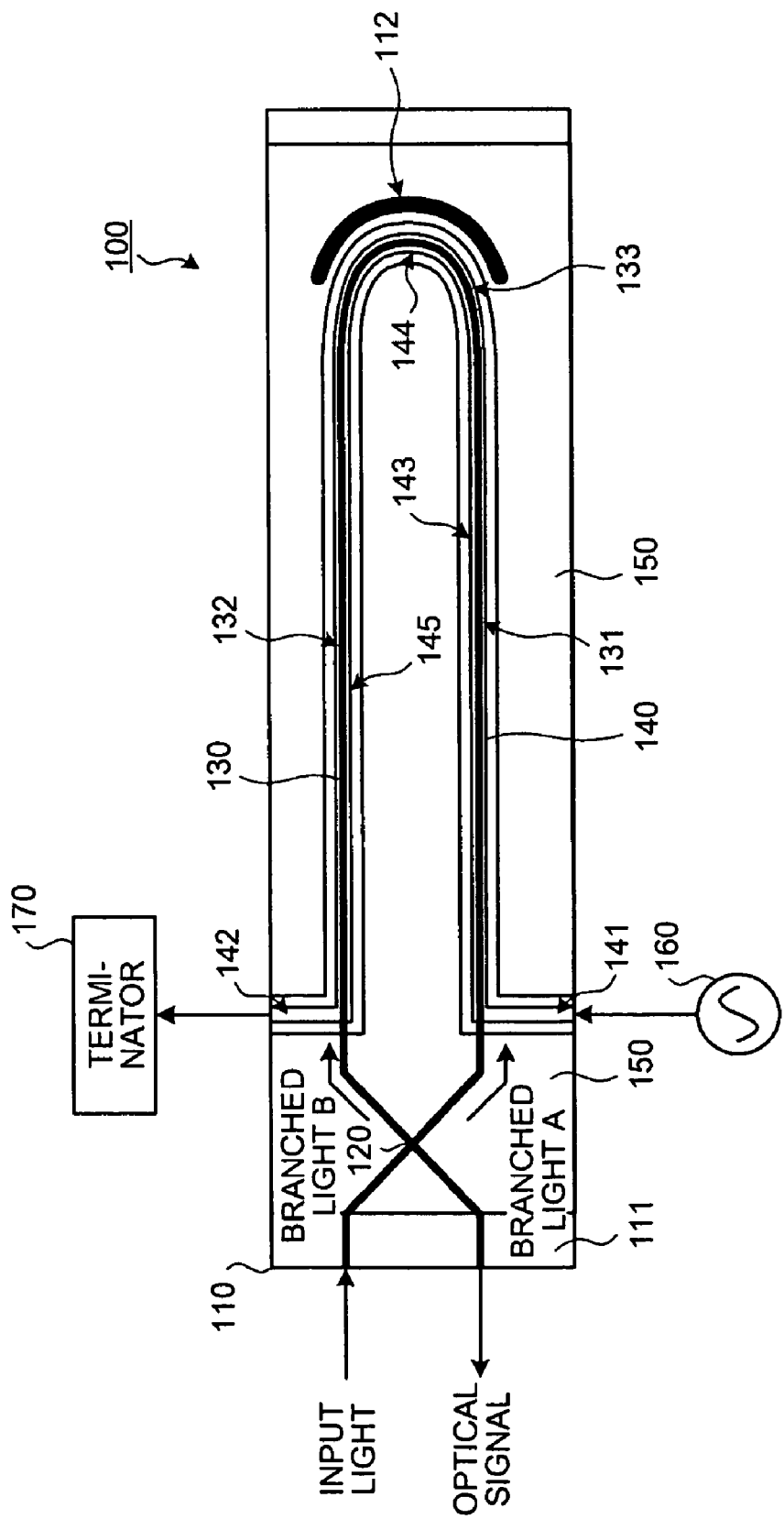
FIG. 21 is a plan view depicting a configuration of an optical modulator according to a fourth embodiment.

FIG. 21 is a plan view depicting a configuration of an optical modulator according to a fourth embodiment. As shown in FIG. 21, the signal electrode 140 of the optical modulator 100 according to the fourth embodiment is provided continuously along the waveguide section 131, the turnback section 133, and the waveguide section 132 of the optical waveguide 130. Specifically, the signal electrode 140 includes a portion 143 along the waveguide section 131, a portion 144 along the turnback section 133, and a portion 145 along the waveguide section 132 continuously formed.

Since the portion 144 of the signal electrode 140 is turned back along with the turnback section 133, the interaction section can be turnback and formed within the substrate 110. The end 141 of the signal electrode 140 connected to the clock signal oscillator 160 is led out from one side on the waveguide section 131 side of the substrate 110, and the end 142 of the signal electrode 140 connected to the terminator 170 is led out from another side on the waveguide section 132 side of the substrate 110.

As described above, according to the optical modulator 100 according to the fourth embodiment, while achieving the effects of the optical modulator 100 according to the first embodiment, the interaction section is turned back along with the turnback section 133 of the optical waveguide 130 by providing the signal electrode 140 continuously along the optical waveguide 130.

Therefore, the required length of the interaction section can be secured even when the substrate 110 is reduced in size (reduced in a horizontal direction with respect to the orientation in the figure), thereby enabling a reduction in size of the optical modulator. Moreover, since the interaction section can be formed long, the required voltage of the electrical clock signal can be reduced. Thereby, energy saving of the optical modulator can be achieved.

Figure 22:
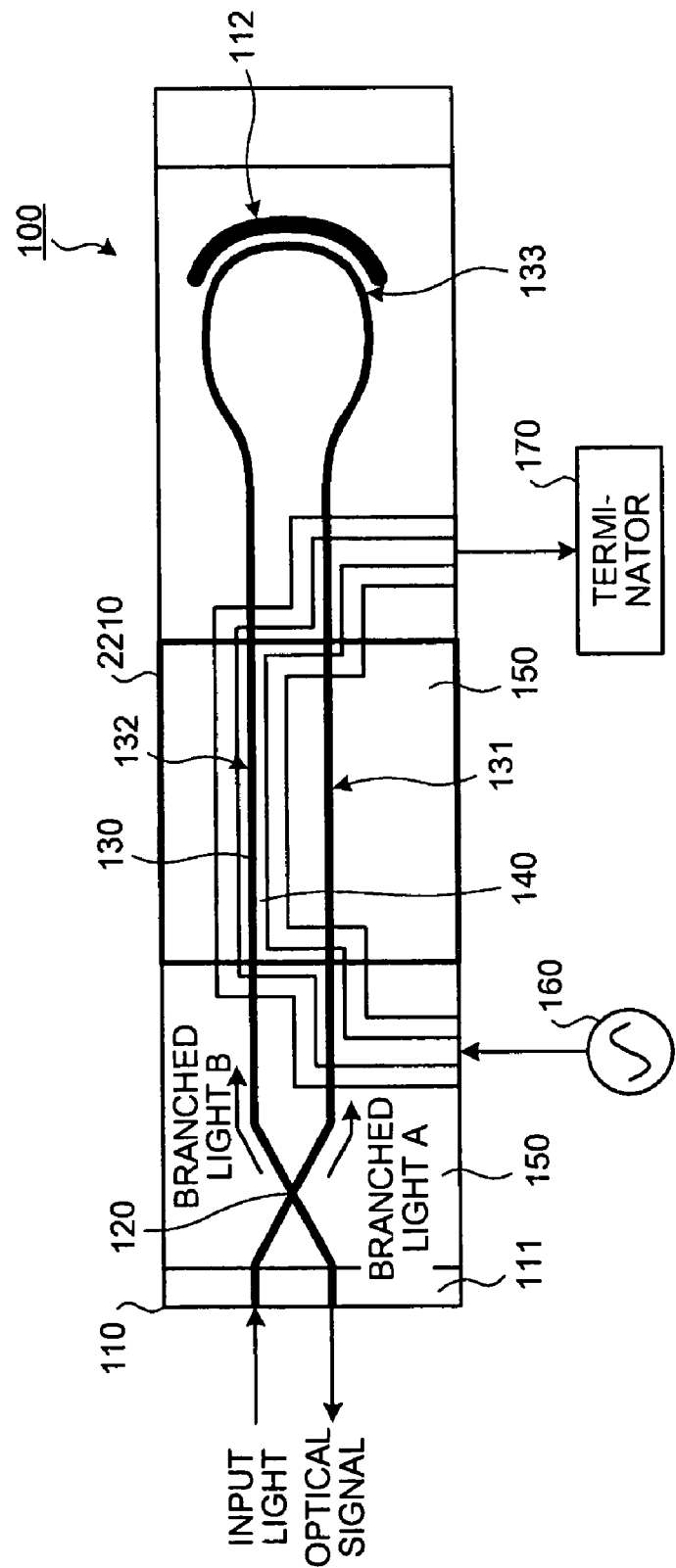
FIG. 22 is a plan view depicting a configuration of an optical modulator according to a fifth embodiment.

FIG. 22 is a plan view depicting a configuration of an optical modulator according to a fifth embodiment. As shown in FIG. 22, the substrate 110 of the optical modulator 100 according to the fifth embodiment has a polarization inversion region 2210 in a portion where the interaction section is formed. A region that is not the polarization inversion region 2210 of the substrate 110 is a polarization non-inversion region.

The direction of polarization in the polarization inversion region 2210 is reversed to that in the polarization non-inversion region. Here, the polarization inversion region 2210 is provided near the center of the interaction section. The signal electrode 140 is provided along the waveguide section 131 in the polarization non-inversion region, and is provided along the waveguide section 132 in the polarization inversion region 2210.

The polarization inversion region 2210 is provided so that a ratio of a length of the interaction section included in the polarization inversion region 2210 and a ratio of that included in the polarization non-inversion region are approximately equal to each other. In this case, what is necessary is just to make the length of the interaction section included in the polarization inversion region 2210 and a total length of that included in the polarization non-inversion region almost equal to each other.

When output from the optical coupler 120 to pass through the waveguide section 131, the branched light A travels in the same direction as the traveling direction of the electrical clock signal of the signal electrode 140. Thereby, a refractive index of the waveguide section 131 with respective to the branched light A becomes is positive. Thus, in the interaction section (where the signal electrode 140 and the waveguide section 131 interact) formed in the polarization non-inversion region, the phase of the branched light A is shifted to a positive direction according to the electrical clock signal.

Meanwhile, the branched light A travels in an opposite direction to the traveling direction of the electrical clock signal, when passing through the waveguide section 132 after being turned back by the turnback section 133. Thereby, the refractive index of the waveguide section 132 with respect to the branched light A alternately changes between positive and negative. For this reason, in the interaction section (where the signal electrode 140 and the waveguide section 132 interact) formed in the polarization inversion region 2210, the phases of the branched light A cancel each other and no shifting occurs.

When output from the optical coupler 120 to then pass through the waveguide section 132, the branched light B travels in the same direction as the traveling direction of the electrical clock signal. Meanwhile, since the interaction section (where the signal electrode 140 and the waveguide section 132 interact) is formed in the polarization inversion region 2210, the direction in which the phase is shifted is reversed. Thereby, the refractive index of the waveguide section 132 with respect to the branched light B becomes negative. For this reason, in the interaction section (where the signal electrode 140 and the waveguide section 132 interact), the phase of the branched light B is shifted to a negative direction according to the electrical clock signal.

Meanwhile, the branched light B travels in an opposite direction to the traveling direction of the electrical clock signal in the interaction section (where the signal electrode 140 and the waveguide section 131 interact), when passing through the waveguide section 131 after being turned back by the turnback section 133. Thereby, the refractive index of the waveguide section 131 with respect to the branched light B alternately changes between positive and negative. For this reason, in the interaction section (where the signal electrode 140 and the waveguide section 131 interact) formed in the polarization non-inversion region, the phases of the branched light B cancel each and no shifting occurs.

As a result, the phase of the branched light A is shifted to a positive direction, and the phase of the branched light B is shifted to a negative direction, according to the electrical clock signal. Thus, the voltage of the electrical clock signal required to establish a phase difference of 0 or $\pi$ between the branched light A and the branched light B can be reduced. Moreover, the length of the interaction section required to establish a phase difference of 0 or $\pi$ between the branched light A and the branched light B can be reduced.

Additionally, since the phases of the branched light A and the branched light B are interlockingly shifted in opposite directions (push-pull operation), wavelength chirp of the optical signal output from the optical coupler 120 can be reduced. Moreover, the ratio of the length of the interaction section included in the polarization inversion region 2210 and the ratio of that included in the polarization non-inversion region are made approximately equal to each other, thus the phase shift amounts of the branched light A and the branched light B can be made approximately equal to each other. Thereby, wavelength chirp of the optical signal output from the optical coupler 120 can be eliminated.

As described above, according to the optical modulator 100 according to the fifth embodiment, while achieving the effects of the optical modulator 100 according to the first embodiment, the required voltage of the electrical clock signal can be reduced by providing the polarization inversion region 2210 in the substrate 110 to change the interaction section in the polarization inversion region 2210. Thereby, energy saving of the optical modulator can be achieved. Moreover, since the required length of the interaction section can be reduced, a reduction in size of the optical modulator can be achieved. Furthermore, degradation of the optical signal due to the wavelength chirp can be prevented.

Figure 23:
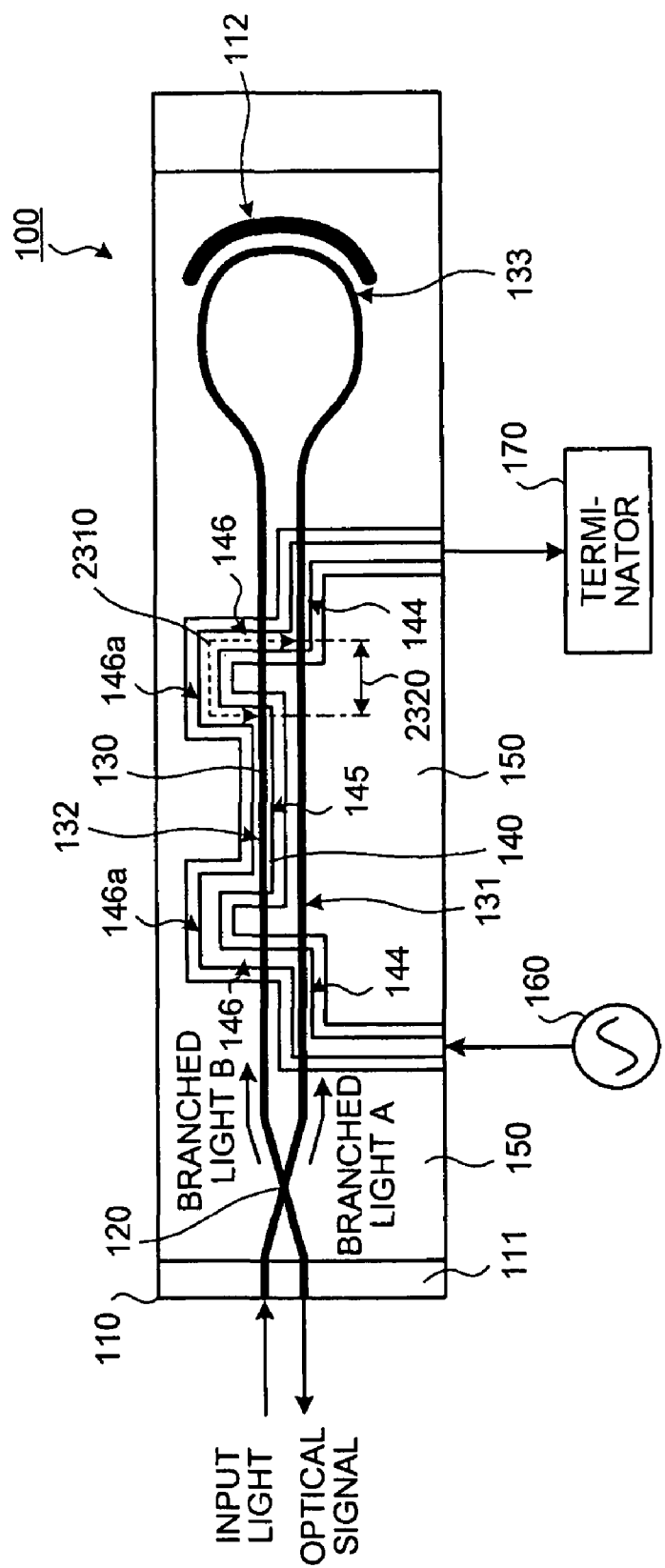
FIG. 23 is a plan view depicting a configuration of an optical modulator according to a sixth embodiment.

FIG. 23 is a plan view depicting a configuration of an optical modulator according to a sixth embodiment. As shown in FIG. 23, the signal electrode 140 of the optical modulator 100 according to the sixth embodiment includes portions 144, the portion 145, and interchange portions 146. The portions 144 are portions that are provided along the waveguide section 131 to thereby form the interaction section with the waveguide section 131. The portion 145 is a portion that is provided along the waveguide section 132 to thereby form the interaction section with the waveguide section 132.

The interchange portions 146 are portions where the waveguide sections 131, 132 forming the interaction section are interchanged. Detours 146a that delay the electrical clock signal passing through the interchange portions 146 are provided in the interchange portions 146. Here, the waveguide section 131, 132 with which the signal electrode 140 forms the interaction section is interchanged twice, for example, the waveguide section 131, the waveguide section 132, and the waveguide section 131.

For this reason, the signal electrode 140 is continuously formed by the portion 144, the interchange portion 146, the portion 145, the interchange portion 146, and the portion 144 in this order. In addition, the interchange portion 146 is provided so that a ratio of a length of the portion 144 and a ratio of a length of the portion 145 in the signal electrode 140 are approximately equal to each other. In this case, what is necessary is just to make a total length of the two portions 144 approximately equal to the length of the portion 145.

Moreover, a length of the detour 146a is set so that a difference between a length 2310 of the interchange portion 146, and a distance 2320 that the branched lights A, B travel in the optical waveguide 130 while the electrical clock signal passes through the interchange portion 146 may be one half of the wavelength λs of the electrical clock signal. As a result, the electrical clock signal passing through the portion 145 is delayed with respect to the electrical clock signal passing through the portion 144 by half a cycle. For this reason, the shift direction of the phase in the interaction section (where the signal electrode 140 and the waveguide section 132 interact) can be reversed.

When output from the optical coupler 120 to pass through the waveguide section 131, the branched light A travels in the same direction as the traveling direction of the electrical clock signal of the signal electrode 140. Thereby, the refractive index of the waveguide section 131 with respective to the branched light A becomes positive. Thus, in the interaction section (where the signal electrode 140 and the waveguide section 131 interact), the phase of the branched light A is shifted to a positive direction according to the electrical clock signal.

Meanwhile, the branched light A travels in an opposite direction to the traveling direction of the electrical clock signal, when passing through the waveguide section 132 after being turned back by the turnback section 133. For this reason, the refractive index of the waveguide section 132 with respect to the branched light A alternately changes between positive and negative. Thus, in the interaction section (where the signal electrode 140 and the waveguide section 132 interact), the phases of the branched light A cancel each other and no shifting occurs.

When output from the optical coupler 120 to then pass through the waveguide section 132, the branched light B travels in the same direction as the traveling direction of the electrical clock signal. Additionally, the direction of phase shift in the interaction section (where the signal electrode 140 and the waveguide section 132 interact) is reversed by the setting of the detour 146a length. Hence, in the interaction section (where the signal electrode 140 and the waveguide section 132 interact), the phase of the branched light B is shifted to a negative direction according to the electrical clock signal.

Moreover, the branched light B travels in an opposite direction to the traveling direction of the electrical clock signal in the interaction section (where the signal electrode 140 and the waveguide section 131 interact), when passing through the waveguide section 131 after being turned back by the turnback section 133. Hence, the phase of the branched light B is not shifted in the interaction section (where the signal electrode 140 and the waveguide section 131 interact).

As a result, the phase of the branched light A is shifted to a positive direction, and the phase of the branched light B is shifted to a negative direction, according to the electrical clock signal. Thus, the voltage of the electrical clock signal required to establish a phase difference of 0 or π between the branched light A and the branched light B can be reduced. Moreover, the length of the interaction section required to establish a phase difference of 0 or π between the branched light A and the branched light B can be reduced.

Additionally, since the phases of the branched light A and the branched light B are interlockingly shifted in opposite directions (push-pull operation), wavelength chirp of the optical signal output from the optical coupler 120 can be reduced. Moreover, the phase shift amounts of the branched light A and the branched light B can be made approximately equal to each other by making the ratio of the length of the portion 144 and the ratio of the length of the portion 145 in the signal electrode 140 equal to each other. Hence, wavelength chirp of the optical signal output from the optical coupler 120 can be eliminated.

As described above, according to the optical modulator 100 according to the sixth embodiment, while achieving the effects of the optical modulator 100 according to the first embodiment, the required voltage of the electrical clock signal can be reduced by interchanging the waveguide section 131, 132 with which the signal electrode 140 forms the interaction section, and providing the detour 146a in the interchange portion 146. Thereby, energy saving of the optical modulator can be achieved. Moreover, since the required length of the interaction section can be reduced, a reduction in size of the optical modulator can be achieved. Furthermore, degradation of the optical signal due to the wavelength chirp can be prevented.

Figure 24:
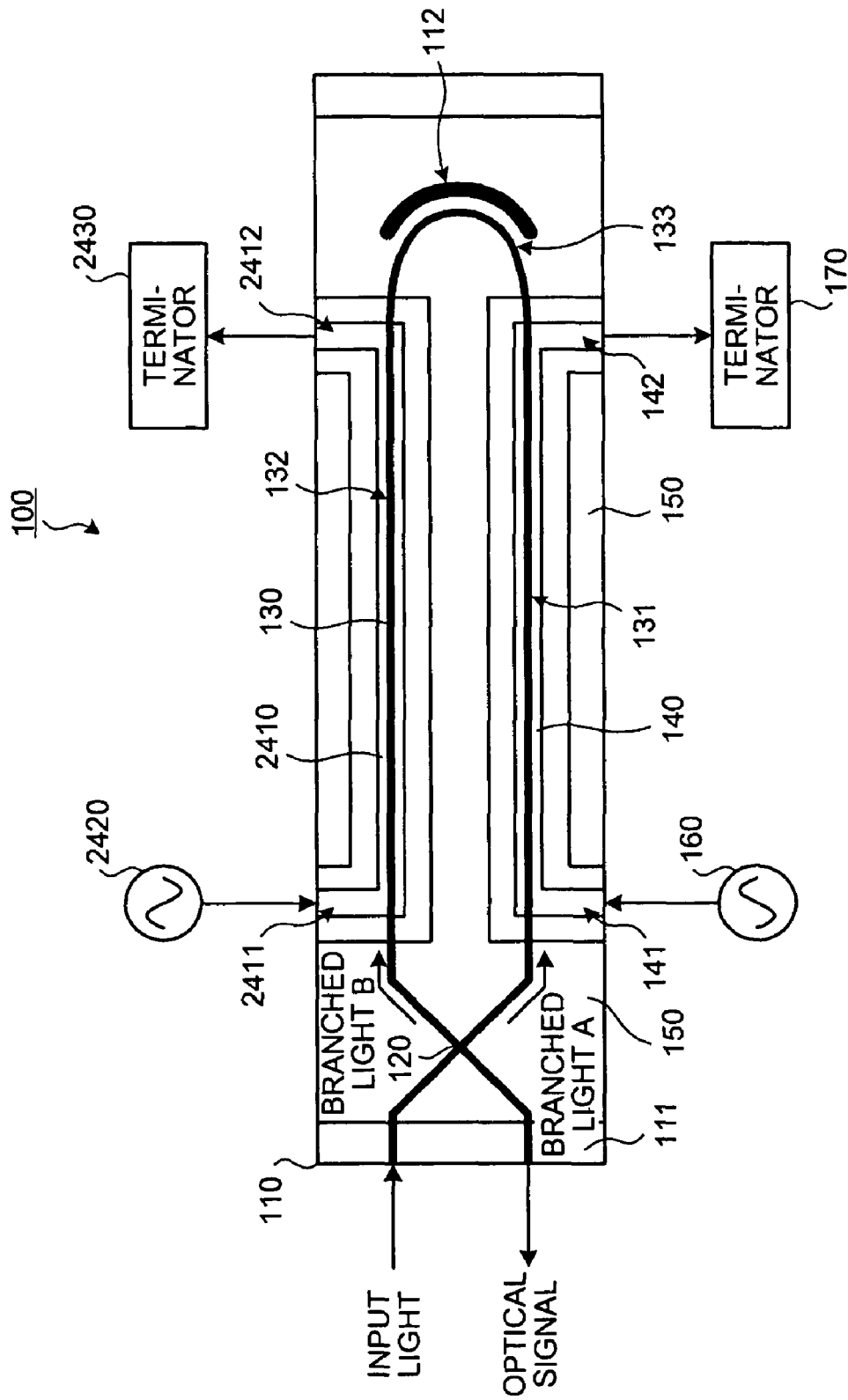
FIG. 24 is a plan view depicting a configuration of an optical modulator according to a seventh embodiment.

FIG. 24 is a plan view depicting a configuration of an optical modulator according to a seventh embodiment. As shown in FIG. 24, the optical modulator 100 according to the seventh embodiment includes a signal electrode 2410 (second signal electrode), a clock signal oscillator 2420, and a terminator 2430 in addition to the configuration of the optical modulator 100 shown in FIG. 1. Accordingly, the optical modulator 100 becomes a dual drive optical modulator. The signal electrode 2410 is provided in the substrate 110 along the waveguide section 132.

The electrical clock signal (second modulation signal) for modulating the light that passes through the waveguide section 132 is input into the signal electrode 2410. In addition, the electrical clock signal input into the signal electrode 140 and the electrical clock signal input into the signal electrode 2410 shall be complementary signals whose phases are reversed to each other. Accordingly, the electrical clock signal that passes through the interaction section (where the waveguide section 131 and the signal electrode 140 interact), and the electrical clock signal that passes through the interaction section (where the waveguide section 132 and the signal electrode 2410 interact) are signals complementary to each other.

For this reason, the shift direction of the phase in the interaction section (where the signal electrode 2410 and the waveguide section 132 interact) can be reversed to the shift direction of the phase in the interaction section (where the signal electrode 140 and the waveguide section 131 interact). Additionally, the length of the interaction section (where the signal electrode 140 and the waveguide section 131 interact) is made approximately equal to the length of the interaction section (where the signal electrode 2410 and the waveguide section 132 interact).

Both ends of the signal electrode 2410 are led out from a side opposite to a side of the substrate 110 from which both ends 141 and 142 of the signal electrode 140 are led out. The clock signal oscillator 2420 is connected to an end 2411 on the optical coupler 120 side of the signal electrode 2410, and the terminator 2430 is connected to an end 2412 on the turn-back section 133 side of the signal electrode 2410.

As a result, the electrical clock signal that is generated by the clock signal oscillator 160 passes through the signal electrode 140 in the same direction as that of the branched light A passing through the waveguide section 131. Meanwhile, the electrical clock signal that is generated by the clock signal oscillator 2420 passes through the signal electrode 2410 in an opposite direction to that of the branched light A that passes through the waveguide section 132.

When output from the optical coupler 120 to pass through the waveguide section 131, the branched light A travels in the same direction as the traveling direction of the electrical clock signal of the signal electrode 140. Thereby, the refractive index of the waveguide section 131 with respective to the branched light A becomes a positive. Thus, in the interaction section (where the signal electrode 140 and the waveguide section 131 interact), the phase of the branched light A is shifted to a positive direction according to the electrical clock signal.

Meanwhile, the branched light A travels in an opposite direction to the traveling direction of the electrical clock signal of the signal electrode 2410, when passing through the waveguide section 132 after being turned back by the turn-back section 133. Thereby, the refractive index of the waveguide section 132 with respect to the branched light A alternately changes between positive and negative. Thus, in the interaction section (where the signal electrode 2410 and the waveguide section 132 interact), the phases of the branched light A cancel each other and no shifting occurs.

When output from the optical coupler 120 to then pass through the waveguide section 132, the branched light B travels in the same direction as the traveling direction of the electrical clock signal of the signal electrode 2410. Additionally, the shift direction of the phase in the interaction section (where the signal electrode 2410 and the waveguide section 132 interact) is reversed to the shift direction of the phase in the interaction section (where the signal electrode 140 and the waveguide section 131 interact). For this reason, in the interaction section (where the signal electrode 2410 and the waveguide section 132 interact), the phase of the branched light B is shifted to a negative direction according to the electrical clock signal.

Meanwhile, the branched light B travels in an opposite direction to the traveling direction of the electrical clock signal of the signal electrode 140, when passing through the waveguide section 131 after being turned back by the turn-back section 133. Thereby, the refractive index of the waveguide section 131 with respect to the branched light B alternately changes between positive and negative. Thus, in the interaction section (where the signal electrode 140 and the waveguide section 131 interact), the phases of the branched light B cancel each other and no shifting occurs.

As a result, the phase of the branched light A is shifted to a positive direction, and the phase of the branched light B is shifted to a negative direction, according to the electrical clock signal. Thus, the voltage of the electrical clock signal required to establish a phase difference of 0 or $\pi$ between the branched light A and the branched light B can be reduced. Moreover, the length of the interaction section required to establish a phase difference of 0 or $\pi$ between the branched light A and the branched light B can be reduced.

Additionally, since the phases of the branched light A and the branched light B are interlockingly shifted in opposite directions (push-pull operation), wavelength chirp of the optical signal output from the optical coupler 120 can be reduced. Moreover, the length of the interaction section (where the signal electrode 140 and the waveguide section 131 interact) is made approximately equal to the length of the interaction section (where the signal electrode 2410 and the waveguide section 132 interact), and thus, the phase shift amounts of the branched light A and the branched light B can be made approximately equal to each other. Thus, wavelength chirp of the optical signal output from the optical coupler 120 can be eliminated.

Additionally, the interaction section (where the signal electrode 2410 and the waveguide section 132 interact) is provided in addition to the interaction section (where the signal electrode 140 and the waveguide section 131 interact), thus the required length of the interaction section can be secured even when the substrate 110 is reduced in size (reduced in a horizontal direction with respect to the figure), thereby enabling a reduction in size of the optical modulator. Moreover, since the interaction section can be formed long, the required voltage of the electrical clock signal can be reduced. Thereby, energy saving of the optical modulator can be achieved.

Figure 25:
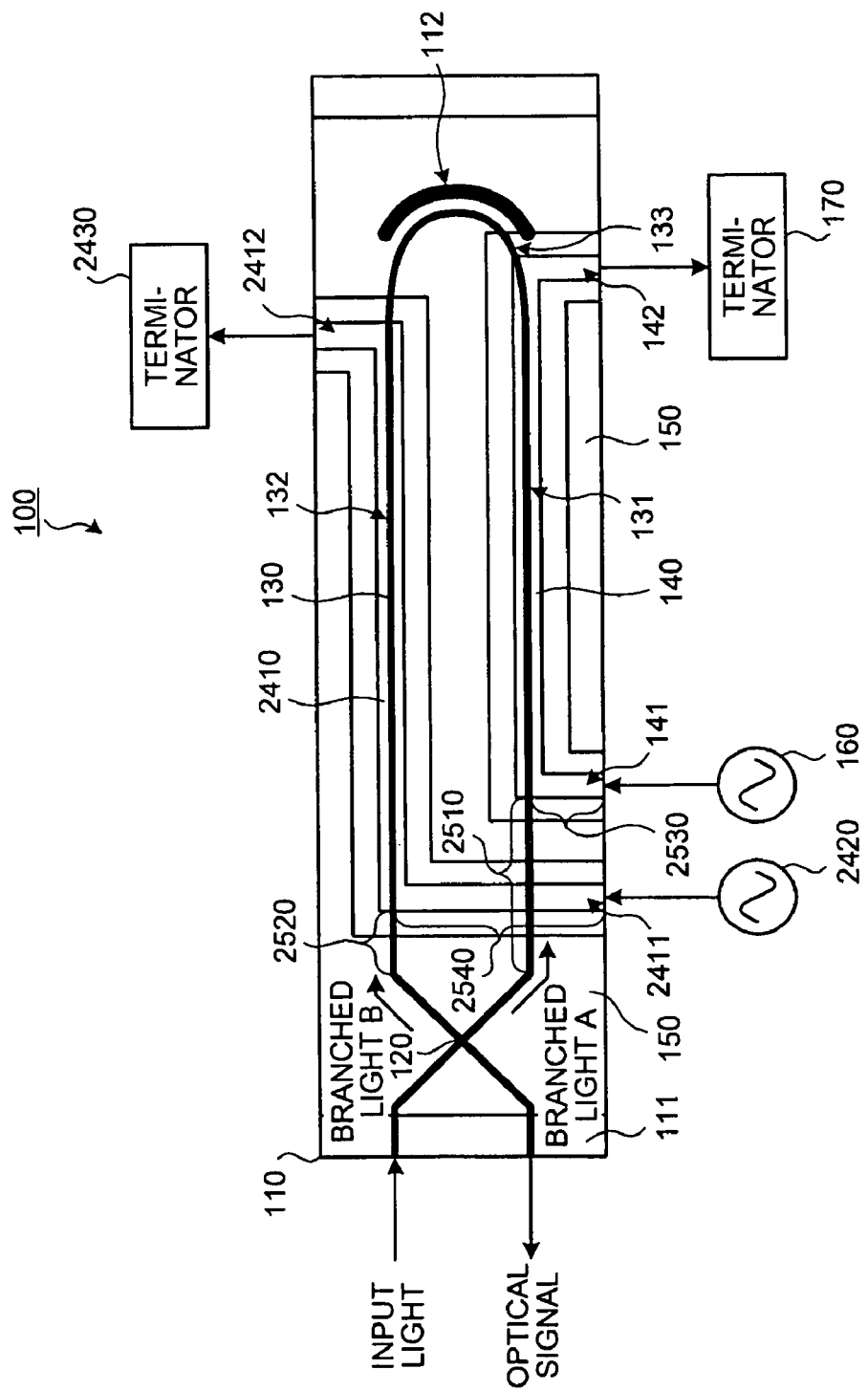
FIG. 25 is a plan view depicting a modified first example of the configuration of the optical modulator according to the seventh embodiment.

FIG. 25 is a plan view depicting a modified first example of the configuration of the optical modulator according to the seventh embodiment. As shown in FIG. 25, according to the optical modulator 100 according to the seventh embodiment, in the configuration of the optical modulator 100 shown in FIG. 24, the end 2411 into which the electrical clock signal of the signal electrode 2410 is input may be led out from the same side of the substrate 110 as that from which the end 141 into which the electrical clock signal of the signal electrode 140 is input is led out.

Here, let an optical length of a path 2510 (first path), from the optical coupler 120 to the interaction section with the signal electrode 140, in the waveguide section 131 be Lo1, and a refractive index of the path 2510 in the waveguide section 131 be no1. Meanwhile, let an optical length of a path 2520 (second path), from the optical coupler 120 to the interaction section with the signal electrode 2410, in the waveguide section 132 be Lo2, and a refractive index of the path 2520 in the waveguide section 132 be no2.

In addition, let a length of a path 2530 (third path), from the end 141 to the interaction section with the waveguide section 131, in the signal electrode 140 be Le1, and a refractive index of the path 2530 in the signal electrode 140 be ne1. Meanwhile, let a length of a path 2540 (fourth path), from the end 2411 to the interaction section with the waveguide section 132, in the signal electrode 2410 be Le2, and a refractive index of the path 2540 in the signal electrode 2410 be ne2.

Here, to lead out the end 141 of the signal electrode 140 and the end 2411 of the signal electrode 2410 from one side of the substrate 110, the path 2540 is made longer than the path 2530. Meanwhile, when the end 141 and the end 2411 are connected with a connector of an external device, it is required to lead out the end 141 and the end 2411 together with sufficient space therebetween since the connector is typically 2 millimeters or more in diameter. For this reason, a position of each interaction section in the waveguide section 131 and the waveguide section 132 is shifted by making the optical length of the path 2510 longer than the optical length of the path 2520.

As a result, even when the electrical clock signals complementary to each other are input into the signal electrode 140 and the signal electrode 2410, the electrical clock signal that passes through the interaction section (where the waveguide section 131 and the signal electrode 140 interact), and the electrical clock signal that passes through the interaction section (where the waveguide section 132 and the signal electrode 2410 interact) may not be complementary signals.

Consequently, the signal electrode 140 and the signal electrode 2410 are provided so that such that no2×Lo2−no1×Lo1+ne1×Le1−ne2×Le2=N×λs (where, N is an integer and Xs is the wavelength of the electrical clock signal). In this case, the electrical clock signals to be signals complementary to each other are input into the signal electrode 140 and the signal electrode 2410, thus the electrical clock signal that passes through the interaction section (where the waveguide section 131 and the signal electrode 140 interact), and the electrical clock signal that passes through the interaction section (where the waveguide section 132 and the signal electrode 2410 interact) are signals complementary to each other.

This makes it possible to reverse the shift direction of the phase in the interaction section (where the signal electrode 2410 and the waveguide section 132 interact) to the shift direction of the phase in the interaction section (where the signal electrode 140 and the waveguide section 131 interact). As a result, an operation similar to that of the optical modulator 100 shown in FIG. 24 can be achieved while leading out the end 141 of the signal electrode 140 and the end 2411 of the signal electrode 2410 from one side of the substrate 110.

The input unit of each signal electrode for the electrical signal can be provided in one side of the optical modulator 100 by leading out the end 141 of the signal electrode 140 and the end 2411 of the signal electrode 2410 from one side of the substrate 110, thus allowing input wirings to the optical modulator 100 to be simplified. For this reason, a reduction in size of the optical transmitter provided with, for example, the optical modulator 100 can be achieved.

Meanwhile, the phase of the branched light A is shifted to a positive direction, and the phase of the branched light B is shifted to the negative direction, according to the electrical clock signal. Thus, the voltage of the electrical clock signal required to establish a phase difference of 0 or π between the branched light A and the branched light B can be reduced. Moreover, the length of the interaction section required to establish a phase difference of 0 or π between the branched light A and the branched light B can be reduced.

Additionally, since the phases of the branched light A and the branched light B are interlockingly shifted in opposite directions (push-pull operation), wavelength chirp of the optical signal output from the optical coupler 120 can be reduced. Moreover, the length of the interaction section (where the signal electrode 140 and the waveguide section 131 interact) is made approximately equal to the length of the interaction section (where the signal electrode 2410 and the waveguide section 132 interact), and thus, the phase shift amounts of the branched light A and the branched light B can be made approximately equal to each other. Thus, wavelength chirp of the optical signal output from the optical coupler 120 can be eliminated.

Additionally, the interaction section (where the signal electrode 2410 and the waveguide section 132 interact) is provided in addition to the interaction section (where the signal electrode 140 and the waveguide section 131 interact), thus the required length of the interaction section can be secured even when the substrate 110 is reduced in size (reduced in a horizontal direction with respect to the figure), thereby enabling a reduction in size of the optical modulator 100. Moreover, since the interaction section can be formed long, the required voltage of the electrical clock signal can be reduced. Thereby, energy saving of the optical modulator can be achieved.

Figure 26:
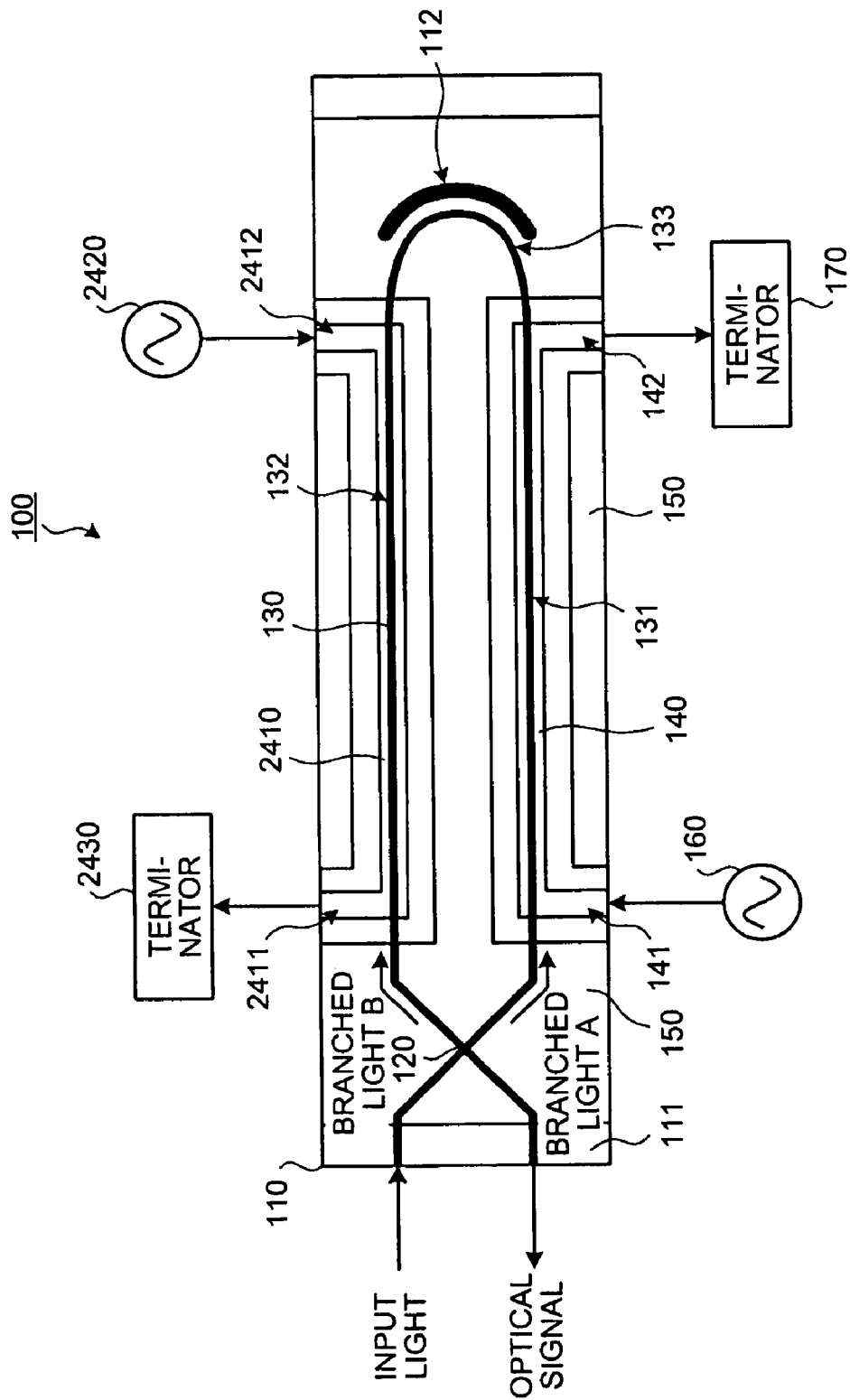
FIG. 26 is a plan view depicting a modified second example of the configuration of the optical modulator according to the seventh embodiment.

FIG. 26 is a plan view depicting a modified second example of the configuration of the optical modulator according to the seventh embodiment. As shown in FIG. 26, according to the optical modulator 100 according to the seventh embodiment, in the configuration of the optical modulator 100 shown in FIG. 24, the terminator 2430 is connected to the end 2411 on the optical coupler 120 side of the signal electrode 2410, and the clock signal oscillator 2420 is connected to the end 2412 on the turnback section 133 side of the signal electrode 2410.

As a result, the electrical clock signal that is generated by the clock signal oscillator 160 passes through the signal electrode 140 in the same direction as that of the branched light A passing through the waveguide section 131. In addition, the electrical clock signal that is generated by the clock signal oscillator 2420 passes through the signal electrode 2410 in the same direction as that of the branched light A passing through the waveguide section 131.

In addition, the electrical clock signal input into the signal electrode 140 and the electrical clock signal input into the signal electrode 2410 shall be signals of identical phase. This makes it possible to match the shift direction of the phase in the interaction section (where the signal electrode 2410 and the waveguide section 132 interact) with the shift direction of the phase in the interaction section (where the signal electrode 140 and the waveguide section 131 interact).

When output from the optical coupler 120 to then pass through the waveguide section 131, the branched light A travels in the same direction as the traveling direction of the electrical clock signal of the signal electrode 140. Thereby, the refractive index of the waveguide section 131 with respect to the branched light A is positive. Thus, in the interaction section (where the signal electrode 140 and the waveguide section 131 interact), the phase of the branched light A is shifted to a positive direction, according to the electric clock signal.

Meanwhile, the branched light A travels in the same direction as the traveling direction of the electrical clock signal of the signal electrode 2410, when passing through the waveguide section 132 after being turned back by the turnback section 133. Thereby, the refractive index of the waveguide section 132 with respect to the branched light A is positive. Thus, in the interaction section (where the signal electrode 2410 and the waveguide section 131 interact), the phase of the branched light A is shifted to a positive direction, according to the electric clock signal.

When output from the optical coupler 120 to then pass through the waveguide section 132, the branched light B travels in an opposite direction to the traveling direction of the electrical clock signal of the signal electrode 2410. Thereby, the refractive index of the waveguide section 132 with respect to the branched light B alternately changes between positive and negative. Thus, in the interaction section (where the signal electrode 2410 and the waveguide section 132 interact), the phases of the branched light B cancel each other and no shifting occurs.

Meanwhile, the branched light B travels in an opposite direction to the traveling direction of the electrical clock signal of the signal electrode 140, when passing through the waveguide section 131 after being turned back by the turnback section 133. Thereby, the refractive index of the waveguide section 131 with respect to the branched light B alternately changes between positive and negative. Thus, in the interaction section (where the signal electrode 140 and the waveguide section 131 interact), the phases of the branched light B cancel each other and no shifting occurs.

As a result, the phase of the branched light A is shifted to a positive direction according to the electrical clock signal, but the phase of the branched light B is not shifted. For this reason, it is possible to set the phase difference between the branched light A and the branched light B to 0 or π according to the electrical clock signal, and output, from the optical coupler 120, the optical signal being intensity modulated to "1", or "0".

Additionally, the interaction section (where the signal electrode 2410 and the waveguide section 132 interact) is provided in addition to the interaction section (where the signal electrode 140 and the waveguide section 131 interact), thus the required length of the interaction section can be secured even when the substrate 110 is reduced in size (reduced in a transverse direction in the figure), thereby enabling a reduction in size of the optical modulator 100. Moreover, since the interaction section of the optical waveguide 130 can be formed long, the required voltage of the electrical clock signal can be reduced. Thereby, energy saving of the optical modulator can be achieved.

The end 2411 into which the electrical clock signal of the signal electrode 2410 is input may be led out from the same side of the substrate 110 as that from which the end 141 into which the electrical clock signal of the signal electrode 140 is input is led out. The same is applies for the configuration of the optical modulator 100 shown in FIG. 26.

Figure 27:
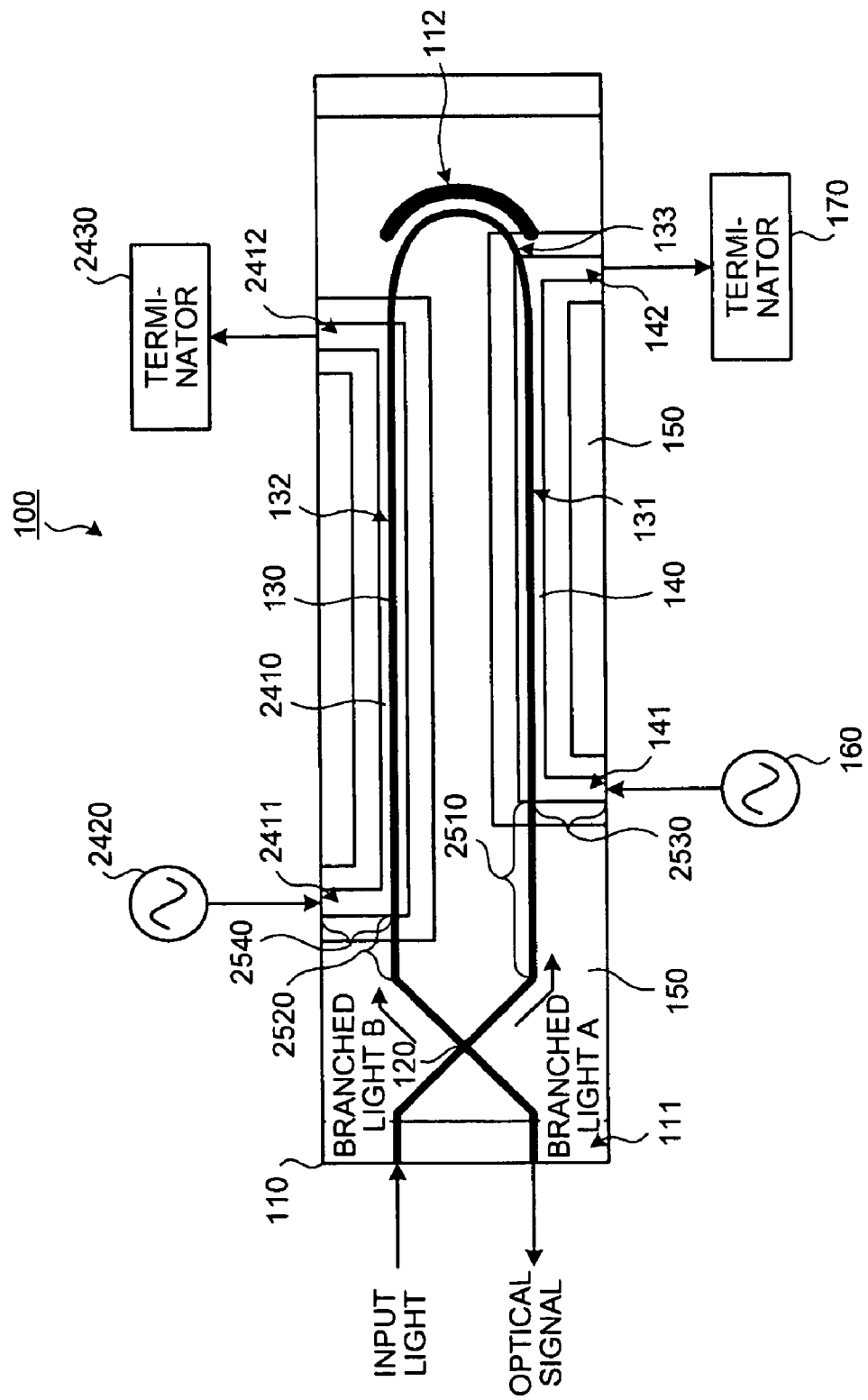
FIG. 27 is a plan view depicting a modified third example of the configuration of the optical modulator according to the seventh embodiment.

FIG. 27 is a plan view depicting a modified third example of the configuration of the optical modulator according to the seventh embodiment. As shown in FIG. 27, according to the optical modulator 100 according to the seventh embodiment, in the configuration of the optical modulator 100 shown in FIG. 24, the electrical clock signal input into the signal electrode 140, and the electrical clock signal input into the signal electrode 2410 may be signals of identical phase.

In this case, the signal electrode 140 and the signal electrode 2410 are provided such that no2×Lo2−no1×Lo1+ne1×Le1−ne2×Le2=(N+½)×λs (where, N is an integer and λs is the wavelength of the electrical clock signal). In this case, the electrical clock signals to be the signals whose phases are in phase are input into the signal electrode 140 and the signal electrode 2410, thus the electrical clock signal that passes through the interaction section (where the waveguide section 131 and the signal electrode 140 interact), and the electrical clock signal that passes through the interaction section (where the waveguide section 132 and the signal electrode 2410 interact) become signals complementary to each other.

This makes it possible to reverse the shift direction of the phase in the interaction section (where the signal electrode 2410 and the waveguide section 132 interact) to the shift direction of the phase in the interaction section (where the signal electrode 140 and the waveguide section 131 interact). For this reason, operation similar to that of the optical modulator 100 shown in FIG. 24 can be achieved while inputting the electrical clock signals to be the signals whose phases are in phase into the signal electrode 140 and the signal electrode 2410.

As a result, the phase of the branched light A is shifted to a positive direction, and the phase of the branched light B is shifted to a negative direction, according to the electrical clock signal. Thus, the voltage of the electrical clock signal required to establish a phase difference of 0 or π between the branched light A and the branched light B can be reduced. Moreover, the length of the interaction section required to establish a phase difference to 0 or π between the branched light A and the branched light B can be reduced.

Additionally, since the phases of the branched light A and the branched light B are interlockingly shifted in opposite directions (push-pull operation), wavelength chirp of the optical signal output from the optical coupler 120 can be reduced. Moreover, the length of the interaction section (where the signal electrode 140 and the waveguide section 131 interact) is made approximately equal to the length of the interaction section (where the signal electrode 2410 and the waveguide section 132 interact), thus the phase shift amounts of the branched light A and the branched light B can be made approximately equal to each other. Thus, wavelength chirp of the optical signal output from the optical coupler 120 can be eliminated.

Additionally, the interaction section (where the signal electrode 2410 and the waveguide section 132 interact) is provided in addition to the interaction section (where the signal electrode 140 and the waveguide section 131 interact), thus the required length of the interaction section can be secured even when the substrate 110 is reduced in size (reduced in a horizontal direction with respect to the figure), thereby enabling a reduction in size of the optical modulator 100. Moreover, since the interaction section of the optical waveguide 130 can be formed long, the required voltage of the electrical clock signal can be reduced. Thereby, energy saving of the optical modulator can be achieved.

As described above, according to the optical modulator 100 according to the seventh embodiment, while achieving the effects of the optical modulator 100 according to the first embodiment, the required length of the interaction section can be secured even when the substrate 110 is reduced in size (reduced in a horizontal direction with respect to the figure) by providing the interaction section (where the signal electrode 2410 and the waveguide section 132 interact) in addition to the interaction section (where the signal electrode 140 and the waveguide section 131 interact). Thereby, a reduction in size of the optical modulator 100 can be achieved.

In addition, a required length of the interaction section can be secured. Thus, the required voltage of the electrical clock signal can be reduced to thereby achieve energy saving of the optical modulator. Moreover, the shift direction of the phase in the interaction section (where the signal electrode 2410 and the waveguide section 132 interact) is reversed to the shift direction of the phase in the interaction section (where the signal electrode 140 and the waveguide section 131 interact), and thus the phases of the branched light A and the branched light B can be interlockingly shifted in opposite directions to thereby reduce wavelength chirp of the optical signal output from the optical coupler 120 (FIG. 24, FIG. 25, FIG. 27).

Figure 28:
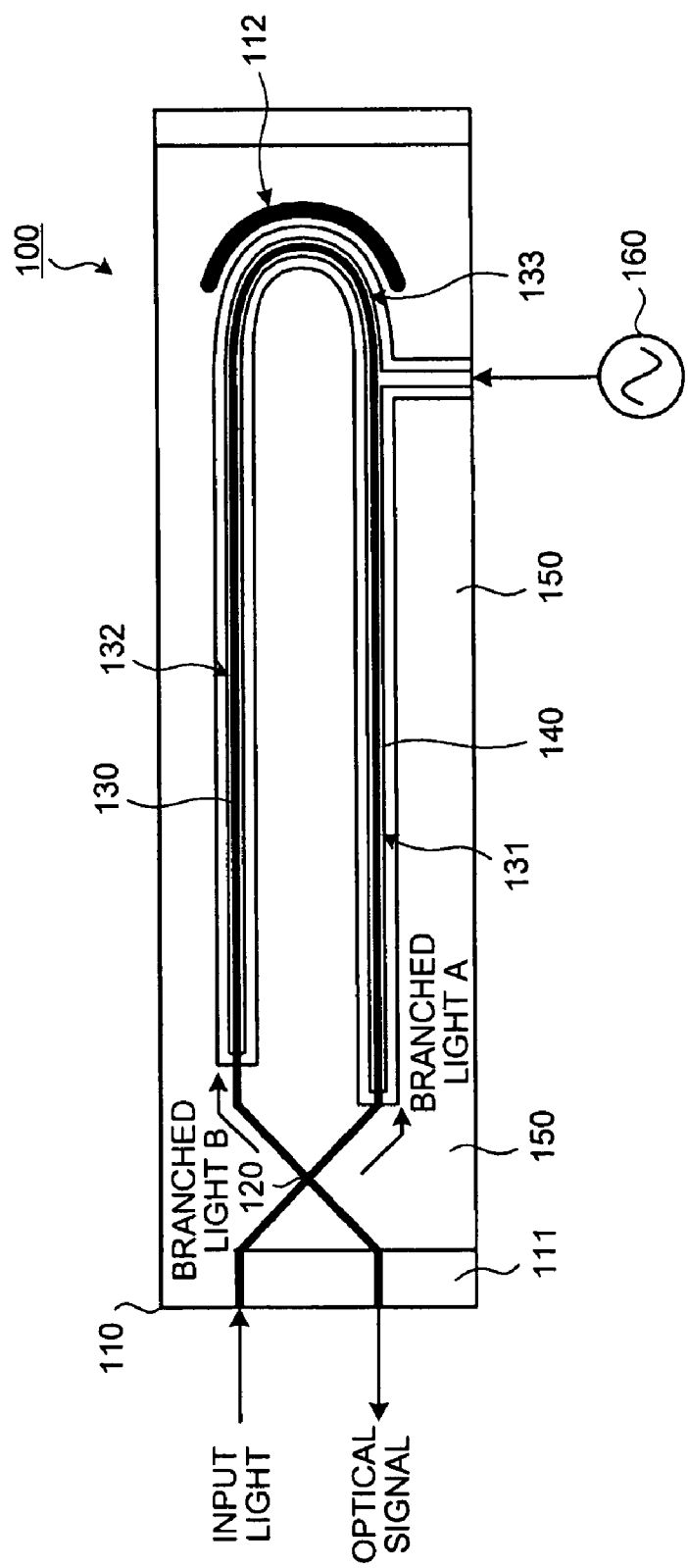
FIG. 28 is a plan view depicting a configuration of an optical modulator according to an eighth embodiment.

FIG. 28 is a plan view depicting a configuration of an optical modulator according to an eighth embodiment. As shown in FIG. 28, the signal electrode 140 of the optical modulator 100 according to the eighth embodiment is a resonance electrode. The signal electrode 140 can be formed into the resonance electrode by making the ends of the signal electrode 140 open or short circuited, for example. The electrical clock signal input into the signal electrode 140 applies an electric field to the interaction section, while being reflecting at the ends of the signal electrode 140.

Forming the signal electrode 140 into the resonance electrode makes it possible to reduce the voltage of the electrical clock signal input into the signal electrode 140. Although the signal electrode 140 is continuously provided along the waveguide section 131, the turnback section 133, and the waveguide section 132 of the optical waveguide 130, the signal electrode 140 may be include, for example, only a portion provided along the waveguide section 131.

As described above, according to the optical modulator 100 according to the eighth embodiment, while achieving the effects of the optical modulator 100 according to the first embodiment, forming the signal electrode 140 into the resonance electrode makes it possible to reduce the voltage of the electrical clock signal input into the signal electrode 140. Thereby, energy saving of the optical modulator can be achieved.

Figure 29:
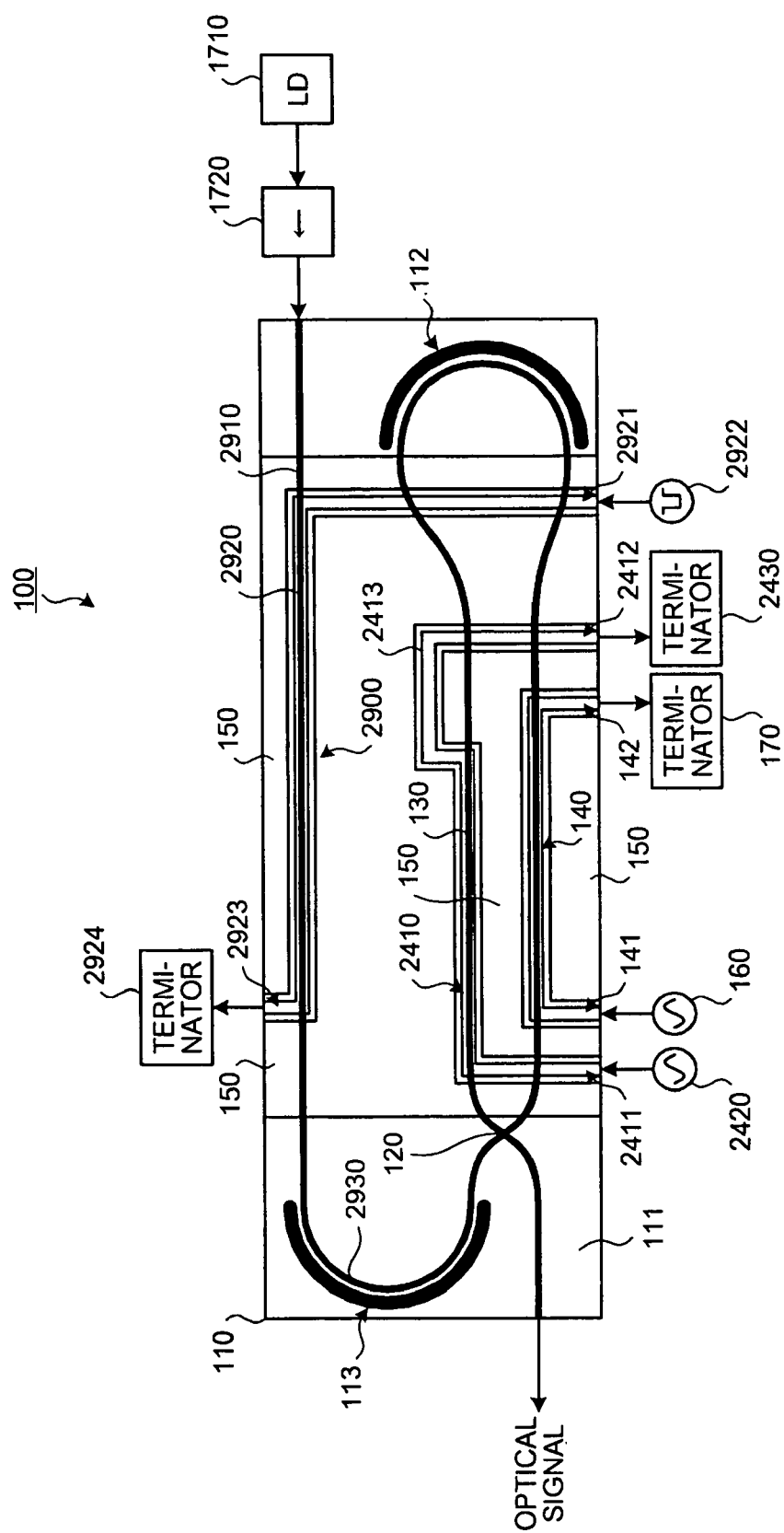
FIG. 29 is a plan view depicting a configuration of an optical modulator according to a ninth embodiment.

FIG. 29 is a plan view depicting a configuration of an optical modulator according to a ninth embodiment. As described in each embodiment, when the phase modulator is used as the clock modulator in which the modulation signal is used as the electrical clock signal, the data optical signal converted to RZ can be generated by providing a data modulating unit that performs data modulation on the light input into the optical coupler 120 of the optical modulator 100, or the optical signal output from the optical coupler 120 thereof.

As shown in FIG. 29, the optical modulator 100 according to the ninth embodiment includes the LD 1710, the optical isolator 1720, and a phase modulating unit 2900 and a turnback waveguide 2930 that are provided in upstream from the optical coupler 120, in addition to the configuration of the optical modulator 100 shown in FIG. 25. The phase modulating unit 2900 includes an optical waveguide 2910 (second data modulation waveguide), a signal electrode 2920 (second data modulation electrode), a data signal input unit 2922, and a terminator 2924.

The optical waveguide 2910 is provided in the substrate 110 to transmit the input light input into the optical coupler 120. Specifically, the optical waveguide 2910 passes the CW light output from the LD 1710 via the optical isolator 1720 for output to the turnback waveguide 2930. The signal electrode 2920 is provided in the substrate 110 along the waveguide 2910.

The electrical data signal for performing data modulation on light passing through the optical waveguide 2910 is input into the signal electrode 2920. The data signal input unit 2922 that inputs the electrical data signal into the signal electrode 2920 is connected to an end 2921 on the LD 1710 side of the signal electrode 2920. The terminator 2924 is connected to an end 2923 on the turnback waveguide 2930 side of the signal electrode 2920.

Both ends (141 and 142) of the signal electrode 140 and both ends (2411 and 2412) of the signal electrode 2410, and the end 2921 of the signal electrode 2920 are both led out from one side of the substrate 110. As a result, the input unit of each signal electrode for the electrical signal can be provided in one side of the optical modulator 100, thus enabling input wirings to the optical modulator 100 to be simplified.

A refractive index of the optical waveguide 2910 is changed by the electrical data signal being input into the signal electrode 2410. As a result, the light passing through the optical waveguide 2910 is subjected to phase modulation according to the electrical data signal. Here, to match the length of the interaction section of the signal electrode 2410 with the length of the interaction section of the signal electrode 140 while leading out the end 2412 of the signal electrode 2410 together with the end 142 of the signal electrode 140, a detour 2413 is also provided in the signal electrode 2410.

The turnback waveguide 2930 turns back the data optical signal output from the phase modulating unit 2900 for input into the optical coupler 120. Specifically, the turnback waveguide 2930 inputs the turned back data optical signal into the input unit 121 of the optical coupler 120 shown in FIG. 2. Additionally, the data optical signal input into the input unit 121 is converted to RZ by the optical coupler 120, the optical waveguide 130 and the signal electrodes 140 and 2410, and is output from the optical coupler 120.

Meanwhile, the turnback waveguide 2930 is a curved waveguide provided in the substrate 110. Here, a groove 113 may be provided in the substrate 110 along a peripheral part of the turnback waveguide 2930. Accordingly, optical loss in the turnback waveguide 2930 when the curvature of the turnback waveguide 2930 is large can be reduced.

Figure 30:
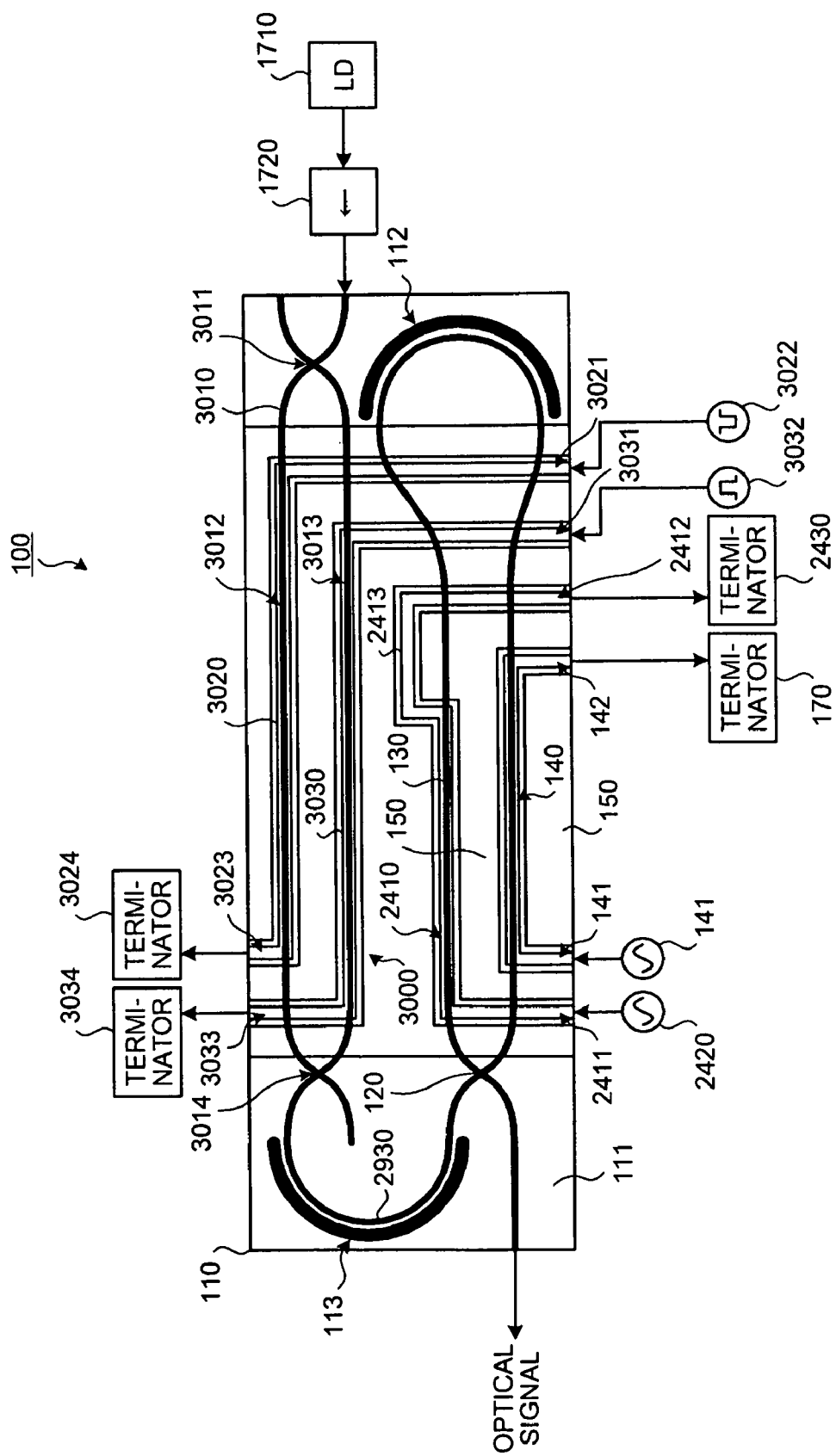
FIG. 30 is a plan view depicting a modified first example of the configuration of the optical modulator according to the ninth embodiment.

FIG. 30 is a plan view depicting a modified first example of the configuration of the optical modulator according to the ninth embodiment. As shown in FIG. 30, the optical modulator 100 according to the ninth embodiment may be provided with an intensity modulating unit 3000 instead of the phase modulating unit 2900 of the optical modulator 100 shown in FIG. 29. The intensity modulating unit 3000 includes an optical waveguide 3010 (third data modulation waveguide), a signal electrode 3020 and a signal electrode 3030 (third data modulation electrode), a data signal input unit 3022 and a data signal input unit 3032, and a terminator 3024 and a terminator 3034.

The optical waveguide 3010 is provided in the substrate 110 to transmit the input light input into the optical coupler 120. The optical waveguide 3010 is a Mach-Zehnder type waveguide having a branching unit 3011, a parallel waveguide 3012, a parallel waveguide 3013, and a coupling unit 3014. The CW light output from the LD 1710 via the optical isolator 1720 is branched by the branching unit 3011.

Each of the branched lights branched by the branching unit 3011 passes through the parallel waveguide 3012 and the parallel waveguide 3013, respectively, and is input into the coupling unit 3014. The branched lights input into the coupling unit 3014 are coupled by the coupling unit 3014. The light coupled by the coupling unit 3014 is output to the turnback waveguide 2930.

The signal electrode 3020 and the signal electrode 3030 are provided in the substrate 110 along the parallel waveguides 3012 and 3013 of the optical waveguide 3010, respectively. The electrical data signals for performing data modulation on the lights passing through the parallel waveguide 3012 of the optical waveguide 3010 are input into the signal electrode 3020 and the signal electrode 3030, respectively. The electrical data signals that are respectively input into the signal electrode 3020 and the signal electrode 3030 are complementary signals whose phases are reversed to each other.

The data signal input unit 3022 that inputs the electrical data signal into the signal electrode 3020 is connected to an end 3021 on the LD 1710 side of the signal electrode 3020. The terminator 3024 is connected to an end 3023 on the turnback waveguide 2930 side of the signal electrode 3020. The data signal input unit 3032 that inputs the electrical data signal into the signal electrode 3030 is connected to an end 3031 on the LD 1710 side of the signal electrode 3030. The terminator 3034 is connected to an end 3033 on the turnback waveguide 2930 side of the signal electrode 3030.

Both ends (141 and 142) of the signal electrode 140 and both ends (2411 and 2412) of the signal electrode 2410, and the ends (3021 and 3031) on the LD 1710 side of the signal electrode 3020 and the signal electrode 3030 are led out from one side of the substrate 110. As a result, the input unit of each signal electrode for the electrical signal can be provided in one side of the optical modulator 100, thus enabling input wirings to the optical modulator 100 to be simplified.

A refractive index of the parallel waveguide 3012 is changed by the electrical data signal being input into the signal electrode 3020. As a result, the light passing through the parallel waveguide 3012 is subjected to phase modulation according to the electrical data signal. Moreover, a refractive index of the parallel waveguide 3013 is changed by the electrical data signal being input into the signal electrode 3030. As a result, the light passing through the parallel waveguide 3012 is subjected to phase modulation according to the electrical data signal.

Light to be output from the coupling unit 3014 is subjected to intensity modulation according to a phase difference between lights passed through the parallel waveguide 3012 and the parallel waveguide 3013. Hence, the light output from the coupling unit 3014 is subjected to intensity modulation according to each of the electrical data signals input into the signal electrode 3020 and the signal electrode 3030.

Figure 31:
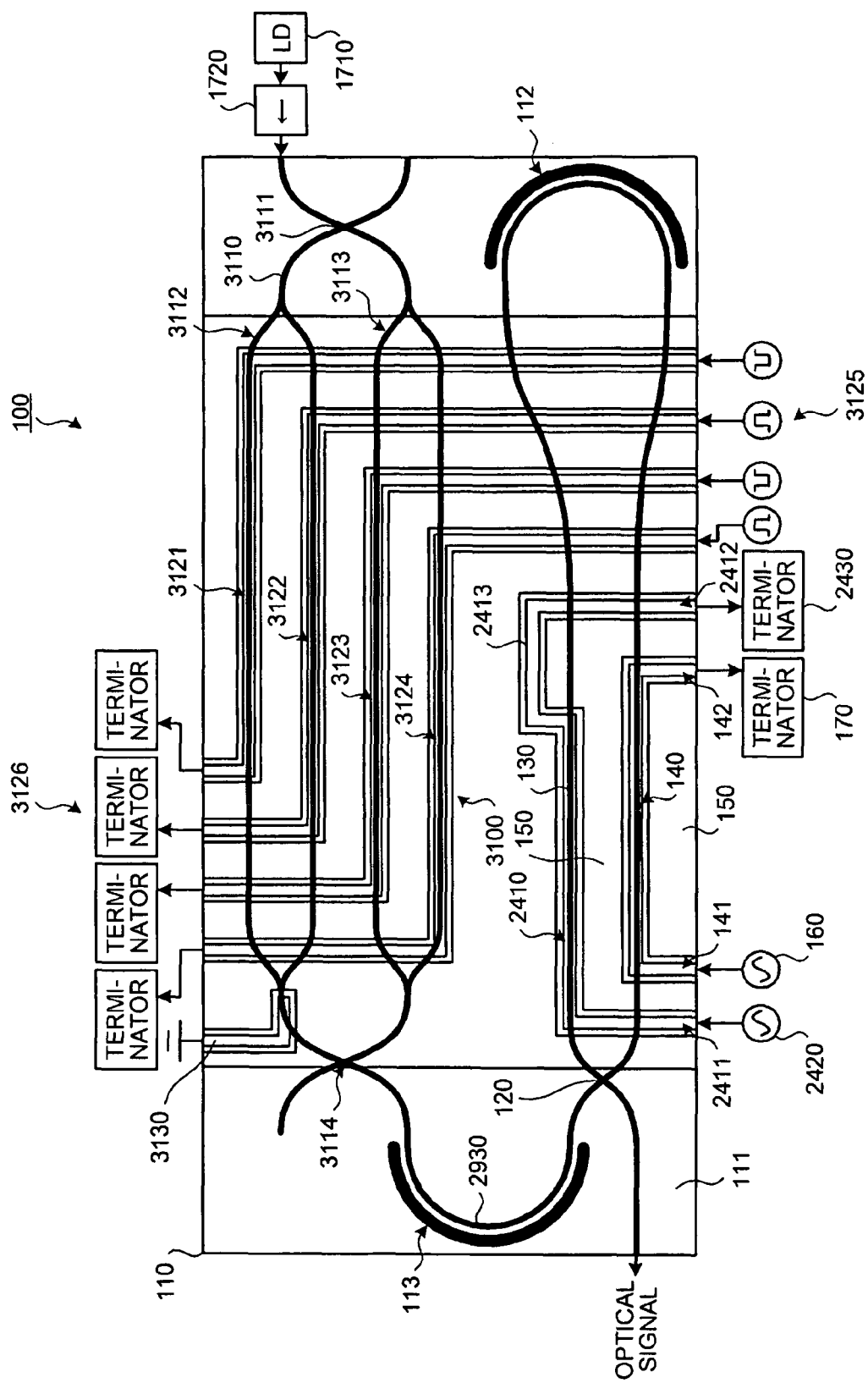
FIG. 31 is a plan view depicting a modified second example of the configuration of the optical modulator according to the ninth embodiment.

FIG. 31 is a plan view depicting a modified second example of the configuration of the optical modulator according to the ninth embodiment. As shown in FIG. 31, the optical modulator 100 according to the ninth embodiment may be provided with a differential phase modulating unit 3100 (differential phase modulator) instead of the phase modulating unit 2900 of the optical modulator 100 shown in FIG. 29. The differential phase modulating unit 3100 includes an optical waveguide 3110 (data modulation waveguide), signal electrodes 3121 to 3124 (data modulation electrode), four data signal input units 3125, four terminators 3126, and a bias electrode 3130.

The optical waveguide 3110 is provided in the substrate 110 to transmit the input light input into the optical coupler 120. The optical waveguide 3110 transmits the CW light output from the LD 1710 via the optical isolator 1720 to the turnback waveguide 2930. The optical waveguide 3110 includes a branching unit 3111, Mach-Zehnder type optical waveguides 3112 and 3113, and a coupling unit 3114.

The Mach-Zehnder type optical waveguides 3112 and 3113 are connected to each other in parallel, and each of the branched lights branched by the branching unit 3111 is input thereto, respectively. Each of the branched lights input into the Mach-Zehnder type optical waveguides 3112 and 3113 passes through Mach-Zehnder type optical waveguides 3112 and 3113, respectively. Operations of the Mach-Zehnder type optical waveguides 3112 and 3113 are similar to the operation of the Mach-Zehnder type optical waveguide 3010 in FIG. 30.

The signal electrodes 3121 and 3122 are provided in the substrate 110 along respective parallel waveguides of the Mach-Zehnder type optical waveguides 3112. The electrical data signals that are respectively input into the signal electrodes 3121 and 3122 are complementary signals whose phases are reversed to each other. The signal electrodes 3123 and 3124 are provided in the substrate 110 along respective parallel waveguides of the Mach-Zehnder type optical waveguides 3113.

The electrical data signals that are respectively input into the signal electrodes 3123 and 3124 are complementary signals whose phases are reversed to each other. Four data signal input units 3125 that input the electrical data signals to respective signal electrodes 3121 to 3124 are connected to each of the ends on the LD 1710 side of the signal electrodes 3121 to 3124. In addition, four terminators 3126 are connected to each of the ends on the turnback waveguide 2930 side of the signal electrodes 3121 to 3124.

Both ends (141 and 142) of the signal electrode 140, and both ends (2411 and 2412) of the signal electrode 2410, and each end on the LD 1710 side of signal electrodes 3121 to 3124 are led out from one side of the substrate 110. As a result, the input units of the signal electrodes 3121 to 3124 for the electrical signals can be provided in one side of the optical modulator 100, thus enabling input wirings to the optical modulator 100 to be simplified.

The bias electrode 3130 is provided in the substrate 110 along the waveguide between the Mach-Zehnder type optical waveguide 3112 and the coupling unit 3114. A bias for shifting the phase of the light passed through the Mach-Zehnder type optical waveguide 3112 with respect to the phase of the light passed through the Mach-Zehnder type optical waveguide 3113 by $\pi/2$ is input into the bias electrode 3130.

The light passed through the Mach-Zehnder type optical waveguide 3112 in which its phase is shifted by $\pi/2$ by the bias electrode 3130, and the light passed through the Mach-Zehnder type optical waveguide 3113 are both input into the coupling unit 3114 to be coupled thereby. The light coupled by the coupling unit 3114 is output to the turnback waveguide 2930.

By inputting the electrical data signal into the signal electrode 3121 and the signal electrode 3122, each of the lights passing through the parallel waveguides of the Mach-Zehnder type optical waveguides 3112 is subjected to phase modulation according to the electrical data signal. Additionally, by inputting the electrical data signal into the signal electrode 3123 and the signal electrode 3124, each of the lights passing through the parallel waveguides of the Mach-Zehnder type optical waveguides 3113 is subjected to phase modulation according to the electrical data signal.

Moreover, by inputting the bias to the bias electrode 3130, the phase of the light passed through the Mach-Zehnder type optical waveguide 3112 is shifted with respect to the phase of the light passed through the Mach-Zehnder type optical waveguide 3113 by $\pi/2$. As a result, the light output from the differential phase modulating unit 3100 is subjected to differential quadrature phase shift keying (DQPSK) according to each of the electrical data signals input into the signal electrode 3121 to 3124.

As described above, according to the optical modulator 100 according to the ninth embodiment, while achieving the effects of the optical modulator 100 according to the seventh embodiment, the data optical signal converted in RZ can be generated by providing the data modulating unit that performs data modulation on the input light input into the optical coupler 120 of the optical modulator 100, or the optical signal output from the optical coupler 120 thereof.

Additionally, a portion that constitutes the clock modulator and the data modulating unit are turned back and connected by the turnback waveguide 2930, thereby making it possible to connect the portion that constitutes the clock modulator to the data modulating unit in series, even when the substrate 110 is reduced in size (short in a horizontal direction with respect to the drawing). Thereby, a reduction in size of the optical modulator can be achieved.

Although a case in which the phase modulating unit 2900, the intensity modulating unit 3000, and the differential phase modulating unit 3100 have been provided as a data modulating unit, has been described in FIG. 29 through FIG. 31, the data modulating unit is not limited to these configurations. Moreover, although a case in which the optical modulator 100 shown in FIG. 25 constitutes a clock modulator, has been described in FIG. 29 through FIG. 31, the optical modulator 100 of the each embodiment is applicable to the optical modulator that constitutes the clock modulator.

For example, the optical modulator 100 shown in FIG. 18 is applied to the optical modulator that constitutes the clock modulator to thereby monitor modulation timings of the optical signal removed by the optical circulator 1810. The electrical data signal is then input into the data modulating unit according to the modulation timings of the monitored optical signal, thereby making it possible to synchronize clock modulation with data modulation.

Moreover, although the configuration in which the data modulating unit has been provided upstream from the optical coupler 120, and the input light input into the optical coupler 120 (input unit 121 in FIG. 2) has been subjected to data modulation by the data modulating unit, has been described, a configuration in which the data modulating unit is provided downstream the optical coupler 120 and the clock modulated optical signal output from the optical coupler 120 (output unit 124 in FIG. 2) is subjected to data modulation by the data modulating unit may be employed.

Figure 32:
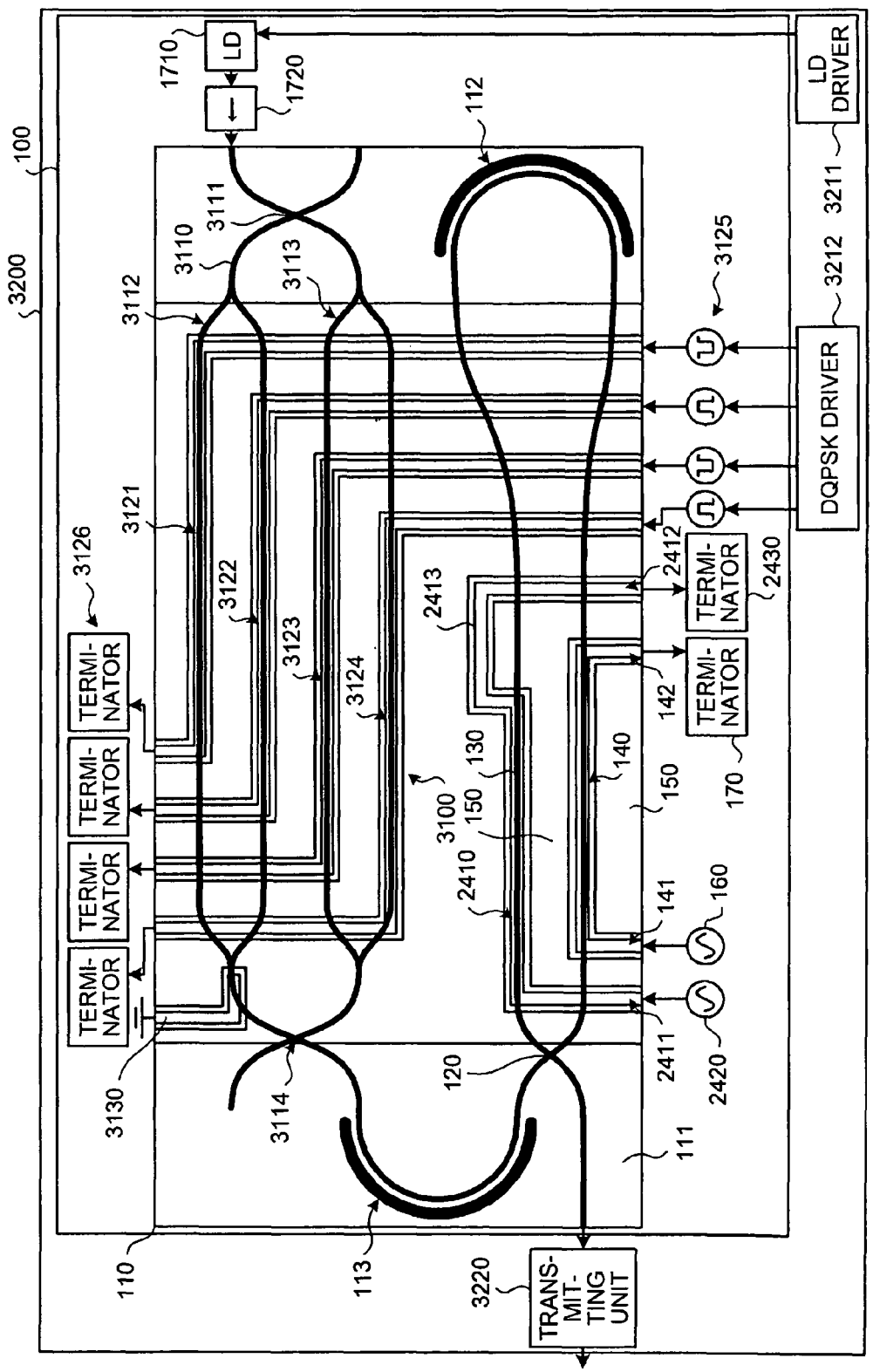
FIG. 32 is a plan view depicting a configuration of an optical transmitter according to a tenth embodiment.

FIG. 32 is a plan view depicting a configuration of an optical transmitter according to a tenth embodiment. As shown in FIG. 32, an optical transmitter 3200 according to the tenth embodiment includes the optical modulator 100 shown in FIG. 31, an LD driver 3211, a DQPSK driver 3212, and a transmitting unit 3220. The optical modulator 100 outputs the modulated optical signal to the transmitting unit 3220. The LD driver 3211 supplies electric power to the LD 1710 of the optical modulator 100 to drive the LD 1710.

The DQPSK driver 3212 supplies the electrical data signal via the four data signal input units 3125 of the optical modulator 100 to drive the optical modulator 100. The transmitting unit 3220 transmits the optical signal output from the optical modulator 100. The transmitting unit 3220 is a connection port connectable to optical fibers and optical connectors of other devices, for example.

As described above, according to the optical transmitter 3200 according to the tenth embodiment, application of the optical modulator 100 according to the ninth embodiment enables reductions in size and cost of the optical transmitter, while improving the modulation characteristics of the optical signal. Although a case in which the optical modulator 100 shown in FIG. 31 has been applied to the optical transmitter 3200, has been described in FIG. 32, the optical modulator 100 of the each embodiment is applicable to the optical transmitter 3200.

As described above, according to the optical modulator and the optical transmitter according to the present invention, a configuration in which the branched lights branched by the optical coupler are modulated and then are input into the optical coupler again to be coupled together, may be employed so that the correction circuit for correcting the operating point drift becomes unnecessary, enabling reductions in size and cost of the optical modulator to be achieved with a simple configuration, while improving the modulation characteristics.

Although a case in which the modulation signal applied to each signal electrode has been the electrical clock signal and the optical modulator 100 has been constituted as a clock modulator, has been described in the first through eighth embodiments, the optical modulator 100 may be constituted as a data modulator by using the modulation signal applied to each signal electrode as the electrical data signal.

When the optical modulator 100 according to the first through eighth embodiments is constituted as a data modulator, data of the electrical data signal applied to each signal electrode may be set to data in which a mark rate for every given period of time is constant, for example. The mark rate is a rate of "0" and "1" included in a data stream. As a result, the direction of the electric field applied to the branched light B equally changes to positive and negative as shown in FIG. 3, thus the phase shift amount of the branched light B can be canceled.

Moreover, although it has been described that the turnback section 133 of the optical waveguide 130 has been a curved waveguide formed in the substrate 110 in the each embodiment, the turnback section 133 is not limited to the curved waveguide formed in the substrate 110. The turnback section 133 can be constituted by a turnback mirror, for example.

Figure 33:
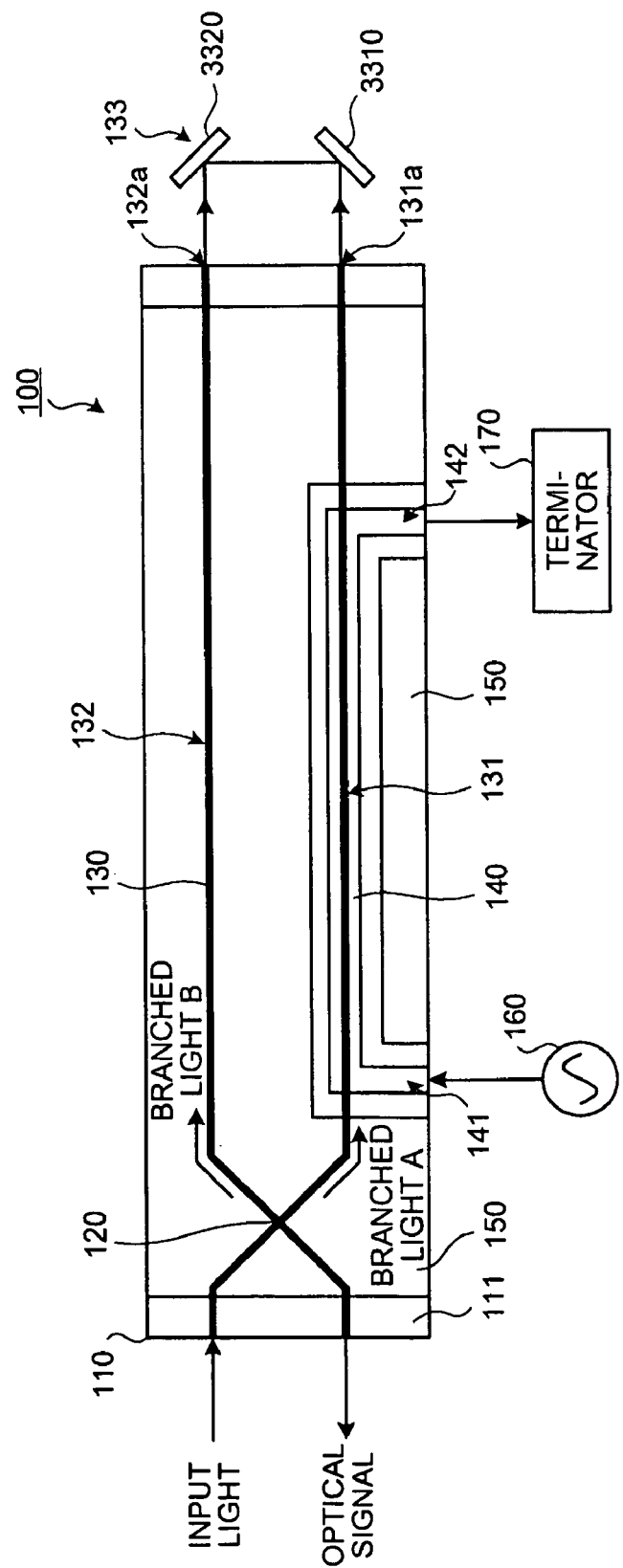
FIG. 33 is a plan view depicting a modified example of the turnback section of the optical waveguide.
Figure 34:
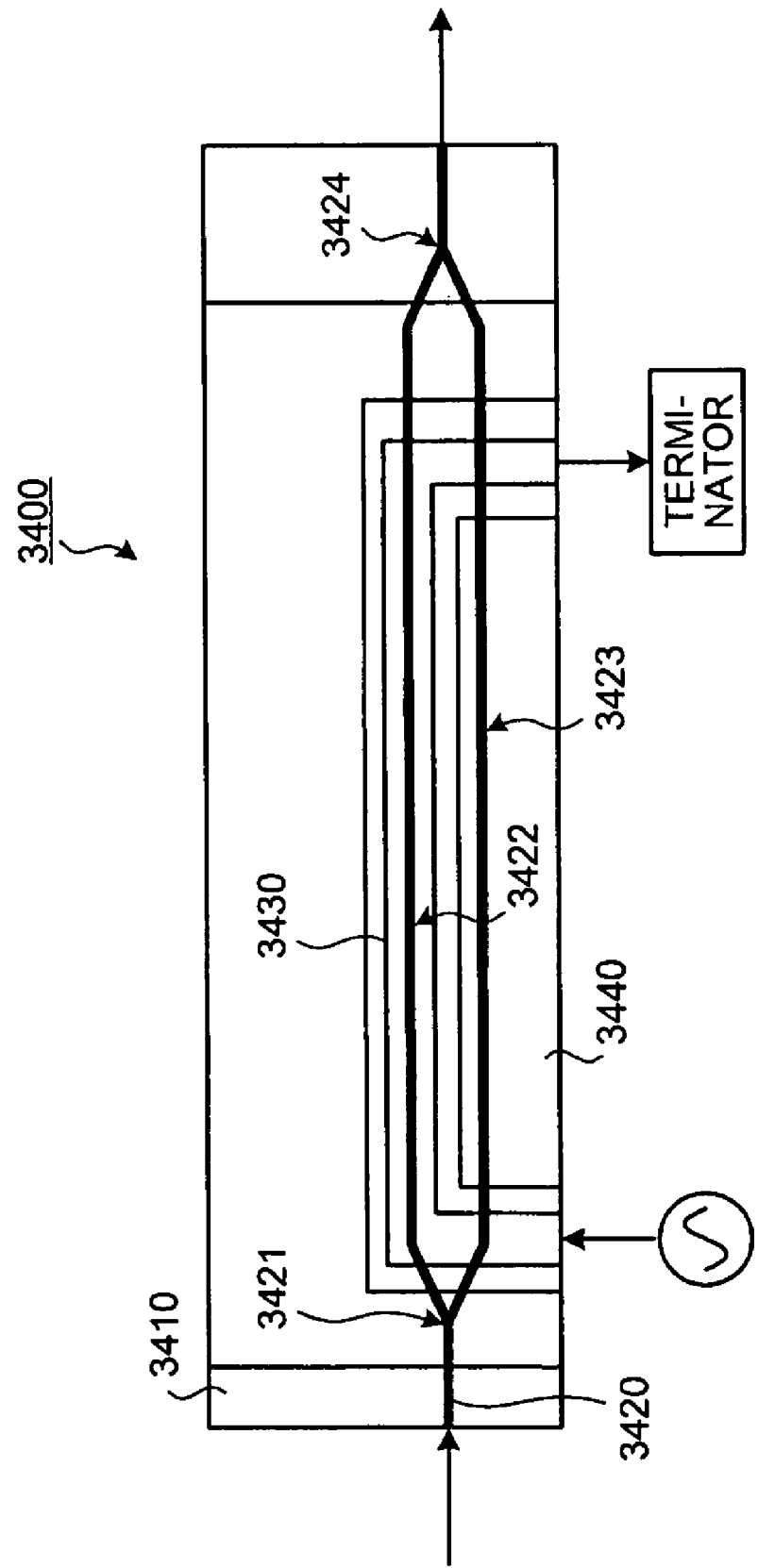
FIG. 34 is a plan view depicting a conventional optical modulator configuration.

FIG. 33 is a plan view depicting a modified example of the turnback section of the optical waveguide. As shown in FIG. 33, the turnback section 133 of the optical waveguide 130 may be turnback mirrors that reflect the branched light A output from the waveguide section 131 for input into the waveguide section 132, and reflect the branched light B output from the waveguide section 132 for input into the waveguide section 131. Specifically, an end 131a opposite to the optical coupler 120 of the waveguide section 131 and an end 132a opposite to the optical coupler 120 of the waveguide section 132 are led out to the end of the substrate 110.

A mirror 3310 and a mirror 3320 as the turnback section 133 are provided outside the substrate 110. Further, a collimator (not shown in the figure) that collimates the lights output from the waveguide section 131 and the waveguide section 132 to the mirror 3310 and the mirror 3320 is provided in the end 131a of the waveguide section 131 and the end 132a of the waveguide section 132.

The mirror 3310 reflects the branched light A output from the waveguide section 131, at a right angle, to the mirror 3320. Additionally, the mirror 3310 reflects the branched light B output from the mirror 3320 at a right angle into the waveguide section 131. The mirror 3320 reflects the branched light B output from the waveguide section 132 at a right angle to the mirror 3310. Additionally, the mirror 3320 reflects the branched light A output from the mirror 3310 at a right angle into the waveguide section 132.

According to the embodiments, a reduction in optical modulator size and cost can be achieved by a simple configuration, while improving the modulation characteristics.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An optical modulator comprising:
   an optical coupler that is formed in a substrate having electro-optic effects and, branches and couples light input thereto,
   an optical waveguide that is formed in the substrate and, includes a turnback section and ends into which the light branched by the optical coupler is input; and
   a first signal electrode provided in the substrate along the optical waveguide and into which a first modulation signal for modulating the light passing through the optical waveguide is input, wherein
   the optical waveguide includes
      a first waveguide section into which a first branched light output from the optical coupler is input,
      a second waveguide section into which a second branched light output from the optical coupler is input, and
      the turnback section optically connecting the first waveguide section and the second waveguide section at respective ends thereof farthest from the optical coupler,
   a polarization non-inversion region and a polarization inversion region having a polarization direction reversed to that of the polarization non-inversion region are formed at an interaction section, where the optical waveguide and the first signal electrode interact, and
   the first signal electrode is provided along the first waveguide section in the polarization non-inversion region, and along the second waveguide section in the polarization inversion region.

2. The optical modulator according to claim 1, wherein the optical coupler is a 2×2 optical coupler and includes
an input unit into which the light is input,
a branching/coupling unit that branches the light input to the input unit into a first branched light and a second branched light, and couples the first branched light and the second branched light into an optical signal,
a first input/output unit that outputs the first branched light to one of the ends of the optical waveguide,
a second input/output unit that outputs the second branched light to another of the ends of the optical waveguide, and
an output unit that outputs the optical signal,
the first branched light is turned back by the optical waveguide and input into the second input/output unit, and
the second branched light is turned back by the optical waveguide and is input into the first input/output unit.

3. The optical modulator according to claim 1, wherein an interaction section, where the first signal electrode and the optical waveguide interact, has a length of at least one half of a wavelength of the first modulation signal.

4. The optical modulator according to claim 1, wherein the turnback section is a curved waveguide formed in the substrate, transmits the first branched light output from the first waveguide section to the second waveguide section, and transmits the second branched light output from the second waveguide section to the first waveguide section.

5. The optical modulator according to claim 1, wherein the turnback section is a curved mirror formed in the substrate, transmits the first branched light output from the first waveguide section to the second waveguide section, and transmits the second branched light output from the second waveguide section to the first waveguide section.

6. The optical modulator according to claim 1, wherein the first signal electrode is a traveling wave electrode.

7. An optical transmitter, comprising:
the optical modulator according to claim 1;
a driving unit that supplies the first modulation signal to the first signal electrode to drive the optical modulator; and
a transmitting unit that transmits an optical signal modulated by the optical modulator.

8. An optical modulator comprising:
an optical coupler that is formed in a substrate having electro-optic effects and, branches and couples light input thereto;
an optical waveguide that is formed in the substrate and, includes a turnback section and ends into which the light branched by the optical coupler is input; and
a first signal electrode provided in the substrate along the optical waveguide and into which a first modulation signal for modulating the light passing through the optical waveguide is input, wherein
the optical waveguide includes
a first waveguide section into which a first branched light output from the optical coupler is input,
a second waveguide section into which a second branched light output from the optical coupler is input, and
the turnback section optically connecting the first waveguide section and the second waveguide section at respective ends thereof farthest from the optical coupler, and the first signal electrode includes
a first portion provided along the first waveguide section and forming an interaction section with the first waveguide section,
a second portion provided along the second waveguide section and forming the interaction section with the second waveguide section, and
an interchange portion including a detour that delays the first modulation signal passing therethrough, and by which the first waveguide section and the second waveguide section are interchanged with each other to form the interaction section.

9. The optical modulator according to claim 8, wherein a length of the detour is such that a difference between a length of the interchange portion and a distance that the first branched light and the second branched light travel in the optical waveguide while the first modulation signal passes through the interchange portion is one half of the wavelength of the first modulation signal.

10. An optical modulator, comprising:
an optical coupler that is formed in a substrate having electro-optic effects and, branches and couples light input thereto;
an optical waveguide that is formed in the substrate and, includes a turnback section and ends into which the light branched by the optical coupler is input;
a first signal electrode provided in the substrate along the optical waveguide and into which a first modulation signal for modulating the light passing through the optical waveguide is input; and
a second signal electrode provided in the substrate along the second waveguide section and into which a second modulation signal for modulating light passing through the second waveguide section is input, wherein
the optical waveguide includes
a first waveguide section into which a first branched light output from the optical coupler is input,
a second waveguide section into which a second branched light output from the optical coupler is input, and
the turnback section optically connecting the first waveguide section and the second waveguide section at respective ends thereof farthest from the optical coupler, and
the first signal electrode is provided along the first waveguide section, and the first modulation signal modulates the light passing through the first waveguide section.

11. The optical modulator according to claim 10, wherein
the first modulation signal passes through the first signal electrode in a direction identical to a direction that the first branched light passes through the first waveguide section,
the second modulation signal passes through the second signal electrode in a direction opposite to the direction that the first branched light passes through the second waveguide section, and
the first modulation signal and the second modulation signal have phases that are inverses of each other.

12. The optical modulator according to claim 11, wherein an end of the second signal electrode into which the second modulation signal is input is led out from a side of the substrate from which an end of the first signal electrode into which the first modulation signal is input is led out.

13. The optical modulator according to claim 12, wherein an optical length of a first path in the first waveguide section from the optical coupler to an interaction section with the first signal electrode is Lo1, a refractive index of the first path in the first waveguide section is no1,
an optical length of a second path in the second waveguide section from the optical coupler to the interaction section with the second signal electrode is Lo2,
a refractive index of the second path in the second waveguide section is no2,
a length of a third path in the first signal electrode from an end thereof into which the first modulation signal is input, to the interaction section with the first waveguide section is Le1,
a refractive index of the third path in the first signal electrode is ne1,
a length of a fourth path in the second signal electrode from an end thereof into which the second modulation signal is input, to the interaction section with the second waveguide section is Le2,
a refractive index of the fourth path in the second signal electrode is ne2,
a wavelength of the modulation signal is λs, and
no2×Lo2−no1×Lo1+ne1×Le1−ne2×Le2=N×λs, where, N is an integer, and
the first modulation signal input into the first signal electrode, and the second modulation signal input into the second signal electrode have phases that are inverses of each other.

14. The optical modulator according to claim 12, wherein
an optical length of a first path in the first waveguide section from the optical coupler to an interaction section with the first signal electrode is Lo1,
a refractive index of the first path in the first waveguide section is no1,
an optical length of a second path in the second waveguide section from the optical coupler to the interaction section with the second signal electrode is Lo2,
a refractive index of the second path in the second waveguide section is no2,
a length of a third path in the first signal electrode from an end thereof into which the first modulation signal is input, to the interaction section with the first waveguide section is Le1,
a refractive index of the third path in the first signal electrode is ne1,
a length of a fourth path in the second signal electrode from an end thereof into which the second modulation signal is input, to the interaction section with the second waveguide section is Le2,
a refractive index of the fourth path in the second signal electrode is ne2,
a wavelength of the modulation signal is λs, and
no2×Lo2−no1×Lo1+ne1×Le1−ne2×Le2=N½)×λs, where, N is an integer, and
the first modulation signal input into the first signal electrode, and the second modulation signal input into the second signal electrode have phases that are in phase with each other.

15. The optical modulator according to claim 10, wherein
the first modulation signal passes through the first signal electrode in a direction identical to a direction that the first branched light passes through the first waveguide section,
the second modulation signal passes through the second signal electrode in a direction identical to the direction that the first branched light passes through the second waveguide section, and
the first modulation signal and the second modulation signal have phases that are in phase.

16. The optical modulator according to claim 15, wherein an end of the second signal electrode into which the second modulation signal is input is led out from a side of the substrate from which an end of the first signal electrode into which the first modulation signal is input is led out.

17. The optical modulator according to claim 16, wherein
an optical length of a first path in the first waveguide section from the optical coupler to an interaction section with the first signal electrode is Lo1,
a refractive index of the first path in the first waveguide section is no1,
an optical length of a second path in the second waveguide section from the optical coupler to the interaction section with the second signal electrode is 2,
a refractive index of the second path in the second waveguide section is no2,
a length of a third path in the first signal electrode from an end thereof into which the first modulation signal is input, to the interaction section with the first waveguide section is Le1,
a refractive index of the third path in the first signal electrode is ne1,
a length of a fourth path in the second signal electrode from an end thereof into which the second modulation signal is input, to the interaction section with the second waveguide section is Le2,
a refractive index of the fourth path in the second signal electrode is ne2,
a wavelength of the modulation signal is λs, and
no2×Lo2−no1×Lo1+ne1×Le1−ne2×Le2=N×λs, where, N is an integer, and
the first modulation signal input into the first signal electrode, and the second modulation signal input into the second signal electrode have phases that are inverses of each other.

18. The optical modulator according to claim 16, wherein
an optical length of a first path in the first waveguide section from the optical coupler to an interaction section with the first signal electrode is Lo1,
a refractive index of the first path in the first waveguide section is no1,
an optical length of a second path in the second waveguide section from the optical coupler to the interaction section with the second signal electrode is Lo2,
a refractive index of the second path in the second waveguide section is no2,
a length of a third path in the first signal electrode from an end thereof into which the first modulation signal is input, to the interaction section with the first waveguide section is Le1,
a refractive index of the third path in the first signal electrode is ne1,
a length of a fourth path in the second signal electrode from an end thereof into which the second modulation signal is input, to the interaction section with the second waveguide section is Le2,
a refractive index of the fourth path in the second signal electrode is ne2,
a wavelength of the modulation signal is λs, and
no2×Lo2−no1×Lo1+ne1×Le1−ne2×Le2=N½)×λs, where, N is an integer, and
the first modulation signal input into the first signal electrode, and the second modulation signal input into the second signal electrode have phases that are in phase with each other.

* * * * *

UNITED STATES PATENT AND TRADEMARK OFFICE
CERTIFICATE OF CORRECTION

| | |
|---|---|
| PATENT NO. | : 8,098,997 B2 |
| APPLICATION NO. | : 12/155120 |
| DATED | : January 17, 2012 |
| INVENTOR(S) | : Masaki Sugiyama |

It is certified that error appears in the above-identified patent and that said Letters Patent is hereby corrected as shown below:

Column 30, Line 43, In Claim 1, delete "thereto," and insert -- thereto; --, therefor.

Column 34, Line 14, In Claim 17, delete "2," and insert -- Lo2, --, therefor.

Signed and Sealed this
Third Day of April, 2012

David J. Kappos
*Director of the United States Patent and Trademark Office*